(12) United States Patent
Li

(10) Patent No.: US 11,179,871 B2
(45) Date of Patent: Nov. 23, 2021

(54) MICROCELLULAR FOAM SHEET AND PROCESSES OF MAKING AND USING

(71) Applicant: DART CONTAINER CORPORATION, Mason, MI (US)

(72) Inventor: Chengtao Li, Novi, MI (US)

(73) Assignee: Dart Container Corporation, Mason, MI (US)

(*) Notice: Subject to any disclaimer, the term of this patent is extended or adjusted under 35 U.S.C. 154(b) by 326 days.

(21) Appl. No.: 16/150,016

(22) Filed: Oct. 2, 2018

(65) Prior Publication Data

US 2019/0111593 A1 Apr. 18, 2019

Related U.S. Application Data

(60) Provisional application No. 62/571,971, filed on Oct. 13, 2017, provisional application No. 62/594,763, filed on Dec. 5, 2017.

(51) Int. Cl.
| | | |
|---|---|---|
| *B29C 44/26* | (2006.01) | |
| *B29C 44/24* | (2006.01) | |
| *B32B 5/18* | (2006.01) | |
| *B32B 27/06* | (2006.01) | |
| *B32B 27/36* | (2006.01) | |
| *B29K 67/00* | (2006.01) | |
| *B29K 105/04* | (2006.01) | |

(52) U.S. Cl.
CPC .............. *B29C 44/24* (2013.01); *B29C 44/26* (2013.01); *B32B 5/18* (2013.01); *B32B 27/065* (2013.01); *B32B 27/36* (2013.01); *B29K 2067/003* (2013.01); *B29K 2105/041* (2013.01); *B29K 2105/043* (2013.01)

(58) Field of Classification Search
None
See application file for complete search history.

(56) References Cited

U.S. PATENT DOCUMENTS

| | | | |
|---|---|---|---|
| 3,571,852 A * | 3/1971 | Gilbert | B29C 44/505 |
| | | | 425/327 |
| 3,953,558 A | 4/1976 | Hatano | |
| 4,360,484 A * | 11/1982 | Rubens | B29C 44/3461 |
| | | | 264/28 |
| 4,473,665 A | 9/1984 | Martini-Vvedensky | |
| 4,925,606 A * | 5/1990 | Francis | C08J 9/122 |
| | | | 264/50 |
| 5,182,307 A | 1/1993 | Kumar | |
| 5,223,545 A | 6/1993 | Kumar | |
| 5,288,764 A * | 2/1994 | Rotter | C08J 9/00 |
| | | | 521/81 |
| 5,684,055 A | 11/1997 | Kumar | |
| 5,723,510 A | 3/1998 | Kabumoto | |
| 6,177,036 B1 | 1/2001 | Van Der Hoeven | |
| 6,245,267 B1 | 6/2001 | Kreiser | |

(Continued)

*Primary Examiner* — Monica A Huson
*Assistant Examiner* — Kelsey C Grace
(74) *Attorney, Agent, or Firm* — McGarry Bair PC

(57) ABSTRACT

A solid state foaming process for generating a microcellular foam sheet for use in forming a container is provided includes a pre-foaming treatment phase prior to a solid state impregnation and foaming phase. The solid state microcellular foam sheet includes a central foamed section defining a foam layer within the microcellular foam sheet having a first population of cells within which are interspersed a second population of cells.

20 Claims, 29 Drawing Sheets

(56) References Cited

U.S. PATENT DOCUMENTS

| | | |
|---|---|---|
| 6,623,674 B1 | 9/2003 | Gehlsen |
| 7,807,260 B2 | 10/2010 | Nadella |
| 8,377,548 B2 | 2/2013 | Nadella |
| 8,568,125 B2 | 10/2013 | Branch |
| 8,858,849 B2 | 10/2014 | Nadella |
| 8,877,331 B2 | 11/2014 | Nadella |
| 8,926,876 B2 | 1/2015 | Kumar |
| 9,427,903 B2 | 8/2016 | Branch |
| 10,029,401 B2 | 7/2018 | Nadella |
| 2010/0052201 A1 | 3/2010 | Nadella |
| 2013/0065981 A1 | 3/2013 | Nadella |
| 2015/0042005 A1 | 2/2015 | Nadella |
| 2015/0353313 A1 | 12/2015 | Nadella |
| 2016/0082693 A1 | 3/2016 | Li |
| 2016/0229973 A1 | 8/2016 | Nadella |

\* cited by examiner

MICROCELLULAR FOAM SHEET AND PROCESSES OF MAKING AND USING

CROSS-REFERENCE TO RELATED APPLICATIONS

This application claims the benefit of U.S. Provisional Patent Application No. 62/571,971, filed Oct. 13, 2017, and U.S. Provisional Patent Application No. 62/594,763, filed Dec. 5, 2017, both of which are incorporated herein by reference in their entirety.

BACKGROUND

Insulated containers, such as cups, can be used to store hot or cold beverages or food while providing a consumer holding the container with some protection from the temperature of the items stored in the container. Containers made from expanded foam materials are beneficial due to their thermal insulating properties and light weight.

Microcellular plastic foam refers to a polymer that has been specially foamed so as to create micro-pores or cells that typically have a cell diameter smaller than that of conventional plastic foams. Microcellular plastic foams can have mechanical properties that are different than conventional plastic foams. Articles made using microcellular plastic foams can provide a reduction in material costs and weights compared to conventional plastic foams. Conventional foam production technology often uses ozone-damaging chlorofluorocarbons (CFCs) or hydrochlorofluorocarbons (HCFCs), as well as flammable hydrocarbons as foaming agents. Microcellular foam processing technology, on the other hand, generally uses more environmentally friendly foaming agents such as non-reacting gases like carbon dioxide and nitrogen.

BRIEF SUMMARY

According to one aspect of the present disclosure, a solid state foaming process for generating a microcellular foam sheet for use in forming a container is provided. The process can include extruding a first layer including a first polymeric material and a blowing agent, wherein the first layer has a first density. The first layer can be at least partially expanded with the blowing agent to form a pre-foamed sheet comprising a pre-foamed layer having a second density, less than the first density. The pre-foamed layer can be impregnated in a solid state with a non-reacting gas that is soluble in the first polymeric material. A second expansion can include at least partially expanding the pre-foamed layer with the non-reacting gas to form a microcellular foam layer having a third density, less than the second density.

According to one aspect of the present disclosure, a solid state foamed microcellular foam sheet for use in forming a container includes a central foamed section defining a foam layer within the microcellular foam sheet and having a first population of cells within which are interspersed a second population of cells having a smaller cell size than the first population, wherein the second population of cells are formed in the material defining the first population of cells within the central foamed section. The foam sheet includes one or more discrete foamed sections, one or more discrete unfoamed sections defining a skin layer, or a combination of one or more discrete foamed sections and discrete unfoamed sections on one or both sides of the central foamed section.

DETAILED DESCRIPTION

Figure 1:
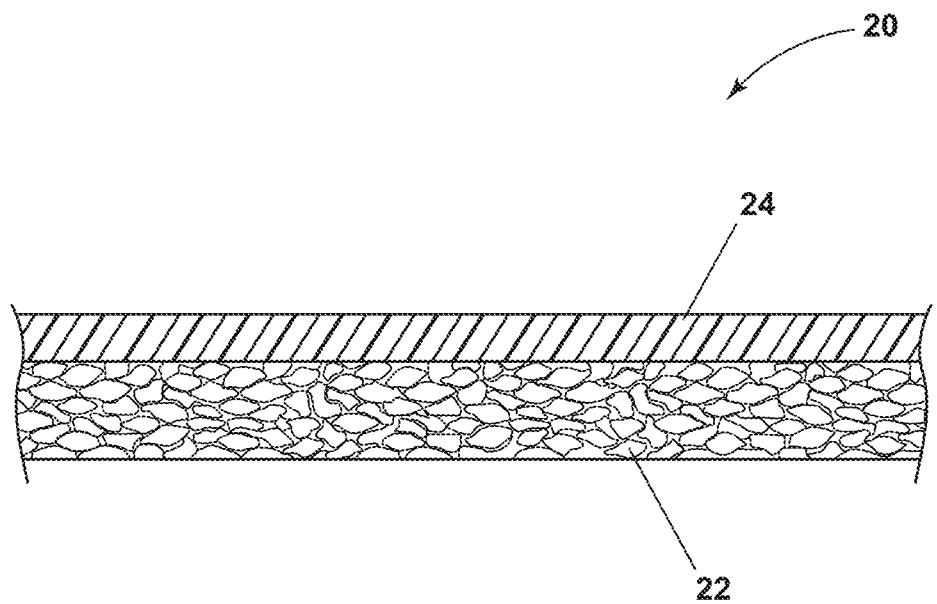
FIG. 1 illustrates a multi-layer sheet for use in forming an article according to aspects of the present disclosure.

Aspects of the present disclosure relate to processes for facilitating the formation of microcellular foam material and forming multi-layer sheets including at least one layer of microcellular foam material. Aspects of the present disclosure also relate to processes for forming articles, such as containers suitable for holding food and beverages, from multi-layer sheets including at least one layer of microcellular foam material. Aspects of the present disclosure utilize solid state foaming processes for generating a microcellular foam in single or multi-layer sheets.

Solid state foaming processes for forming microcellular foam generally include exposing a polymeric material to a non-reacting gas to impregnate the polymeric material with a sufficient concentration of gas to permit cell nucleation within the polymeric material. Typically, exposure to the non-reacting gas occurs at increased pressures to facilitate absorption of the non-reacting gas by the polymeric material and occurs after the material has been extruded. Following impregnation with a non-reacting gas, the polymeric material is exposed to an atmosphere of lower pressure and is heated to a temperature range close to or slightly higher than its glass transition temperature ($T_g$), but not melted, to cause the absorbed gas within the material to nucleate bubbles. Because the polymeric materials remains as a solid and is not melted during the absorption and foaming phases, the polymeric material is considered as being foamed in a solid state. Process parameters such as the impregnation pressure, cycle time, and foaming temperature can effect properties of the foamed material, including cell size, shape, and density. The cell size, shape, and density of the foam material can affect the properties of an article made from the foam material, including a density of the material and the insulative properties of the material.

The concentration of gas impregnated within the polymeric material can be affected by parameters such as the length of time the polymeric material is exposed to the gas and the pressure during exposure. The length of time the polymeric material has to be exposed to the gas to achieve a desired impregnation concentration can be a rate limiting step in the process of forming a microcellular foam and in forming articles using a microcellular foam. Impregnation times for microcellular foam polymeric materials used to thermoform containers can be as long 40 hours or more.

Aspects of the present disclosure relate to a pre-foam treatment process that decreases the time to achieve a predetermined impregnation concentration of the non-reacting gas within the polymeric material during a solid state foaming process. The pre-foam treatment process includes combining the polymeric material that ultimately forms the microcellular foam with a blowing agent to form an extrusion blend. The extrusion blend is extruded to form a polymeric extrudate and at least partially expanded to create voids within the extruded material prior to impregnating the material during a solid state foaming process with a non-reacting gas that generates the microcellular foam.

According to an aspect of the present disclosure, the microcellular foam formed according to the pre-foam treatment process can include discrete foamed and unfoamed sections including a central foam section having a first population of cells within which are interspersed a second population of cells having a smaller cell size than the first population. The discrete foamed and unfoamed sections can form layers within the microcellular foam material. The second population of cells are formed in the material defining the first population of cells within the central foamed section. Optionally, the microcellular foam material can include one or more discrete foam sections on one or both sides of the central foam section. Aspects of the present disclosure can include discrete, unfoamed outer sections forming an outer surface, also referred to as a skin, of the microcellular foam material. According to one aspect of the present disclosure, a pair of discrete unfoamed sections can be present on each side of the central foamed section and optionally one or more pairs of discrete foamed sections can be present on each side of the central foamed section between the central foamed section and the discrete unfoamed sections. The microcellular foam material can be used alone as a single layer sheet or combined with other layers of material to form a multi-layer sheet.

Aspects of the present disclosure can decrease the time to achieve a predetermined impregnation concentration of the non-reacting gas during solid state foaming that generates the foam by about 40%, optionally by about 50% or more compared to a process that does not include the pre-foam treatment of the present disclosure. Decreasing the impregnation time can decrease the overall cycle time for producing a multi-layer sheet including a microcellular foam layer and for producing articles from the multi-layer sheet including a microcellular foam layer. In another aspect, microcellular foam produced in a process that includes the pre-foam treatment of the present disclosure produces a microcellular foam having properties that are different than those of a microcellular foam produced without the pre-foam treatment, such as differences in insulative properties and surface finishes. In still another aspect, a solid state foaming process that includes the pre-foam treatment process of the present disclosure produces a foam sheet having a cellular structure that is different than a similar solid state foaming process without the pre-foam treatment process.

Structure

Figure 2:
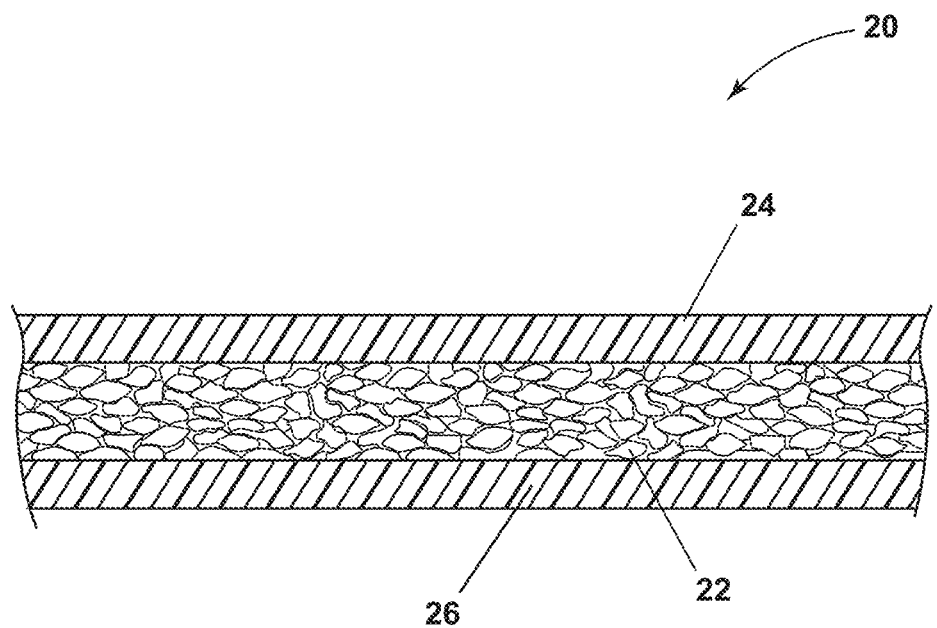
FIG. 2 illustrates a multi-layer sheet for use in forming an article according to an aspect of the present disclosure.

Referring to FIGS. 1 and 2, a multi-layer sheet 20 according to an aspect of the present disclosure includes a foam first or core layer 22 and optionally at least one second or outer sheet layer 24. The multi-layer sheet 20 can include a single outer sheet layer 24 adjacent one side of the foam core layer 22, in an "AB" structure, as illustrated in FIG. 1. Optionally, as illustrated if FIG. 2, the multi-layer sheet 20 can include the foam core layer 22 disposed between opposing first and second outer layers 24 and 26 in an "ABA" structure. Optionally, multiple outer layers may be provided on one or both sides of the foam core layer 22. According to one aspect of the present disclosure, multiple foam layers 22 and multiple outer layers 24 and/or 26 can be combined according to any desired layer pattern to provide the desired multi-layer sheet.

According to one aspect of the present disclosure, the foam core layer 22 is formed and used without a second outer layer. Thus, while some aspects of the present disclosure are described in the context of a multi-layer sheet including a foam core layer 22 and one or more outer layers 24, 26, it will be understood that the materials, processes for making, and process for forming described herein can be used in a similar manner with a sheet including a single foam core layer. The terms "foam" and "expanded" are used interchangeably throughout the disclosure to refer to polymeric materials in which a gas has expanded to generate bubbles (also referred to as cells) that produce a cellular structure within the material. As used herein, the term "multi-layer sheet" refers to a material that is formed by individual layers of materials that are laminated, extrusion coated, or co-extruded.

The multi-layer sheet 20 includes one or more thermoplastic polymeric materials for use as the base material in each of the foam core layer 22 and the outer sheet layer 24. The polymeric material of the foam core layer 22 can be the same or different from the polymeric material of the outer sheet layer 24. Suitable polymeric materials can be any material capable of being extruded or co-extruded and expanded to form foams and can include any one or more of the following polymers: polyethylene terephthalate (PET) including recycled PET, plant based PET, modified PET copolymer, amorphous or crystalline PET, glycol-modified (PETG), and other polyesters, as well as polyether ether ketone (PEEK), polyethylene naphthalate (PEN), polybutylene terephthalate (PBT), polymethyl methacrylate (PMMA), polyhydroxy alkanoates (PHA), polylactic acid (PLA), thermoplastic urethane (TPU), polycarbonate (PC), polystyrene (PS), polypropylene (PP), polyethylene (PE), as well as various polymeric blends thereof.

Optionally, the polymeric material forming the foam core layer 22 and/or the outer sheet layer 24 includes at least a portion of regrind material. Regrind material can include recycled trimmed material and/or recycled waste material that is ground for inclusion in a polymeric blend.

The foam core layer 22 forms a microcellular foam layer that can include discrete foamed and unfoamed sections including a central foam section having a first population of cells within which are interspersed a second population of cells having a smaller cell size than the first population. The discrete foamed and unfoamed sections can form layers within the foam core layer 22. According to one aspect of the present disclosure, the first population of cells (the larger cells), have a cell size defined as having a diameter in at least one dimension, optionally all dimensions, in the range of about 40 to 300 micrometers, optionally about 70 to 300 micrometers. In another aspect, the first population of larger cells has a cell size defined as an average diameter in at least one dimension, optionally all dimensions, in the range of about 180±40 micrometers, optionally about 160±50 micrometers.

In one aspect of the present disclosure, the second population of cells (the smaller cells), have a cell size defined as having a diameter in at least one dimension, optionally all dimensions, in the range of about 1 to 20 micrometers, optionally about 2 to 20 micrometers, further optionally about 2 to 14 micrometers, further optionally about 1 to 9 micrometers. According to one aspect, the second population of smaller cells has a cell size defined as an average diameter in at least one dimension, optionally all dimensions, in the range of about 8±4 micrometers, optionally about 8±3 micrometers, further optionally about 5±3 micrometers, further optionally about 4±2 micrometers.

According to an aspect of the present disclosure, the second population of smaller cells can generally be considered as having a cell size that is an order of magnitude smaller than the larger cells of the first population. The second population of cells have a size corresponding to microcells and thus the material of the present disclosure can be considered as a microcellular foam according to an aspect of the present disclosure. According to one aspect, the first population of larger cells has a diameter in the range of about 40 to 300 micrometers, optionally about 70 to 300 micrometers, in combination with a second population of smaller cells having a diameter in the range of about 1 to 20 micrometers, optionally about 2 to 20 micrometers, further optionally about 2 to 14 micrometers, further optionally about 1 to 9 micrometers. In one aspect of the present disclosure, the first population of larger cells has an average diameter in the range of about 180±40 micrometers, optionally about 160±50 micrometers, in combination with a second population of smaller cells having an average diameter in the range of about 8±4 micrometers, optionally about 8±3 micrometers, further optionally about 5±3 micrometers, further optionally about 4±2 micrometers.

According to one aspect of the present disclosure, the first population of cells has an average diameter greater than 100 micrometers in combination with a second population of cells having an average diameter less than 20 micrometers, optionally less than 10 micrometers. In comparison, conventional plastic foams typically have single population of cells within a given foam section having an average cell diameter ranging from upwards of 100 to 500 micrometers.

The outer sheet layer 24 can be an unfoamed (also referred to as unexpanded), solid layer or may exhibit some degree of cellular structure less than the foam core layer 22. As used herein, an outer sheet layer refers to a layer of polymeric material abutting the foam core layer 22 having a density that is greater than the foam core layer 22 and which is provided adjacent the foam core layer 22 by a process of lamination, extrusion coating, or co-extrusion. When the outer sheet layer 24 exhibits an expanded foam structure, the cellular structure may or may not be a microcellular foam structure.

According to one aspect, the multi-layer sheet 20 can have a thickness suitable for forming an article, an example of which includes containers and lids for containers suitable for storing food or beverages or other items. The multi-layer sheet 20 can have a total thickness suitable for forming the article by thermoforming, such as in the range of about 0.01 to 0.06 inches (about 0.2 to about 1.5 mm). The outer sheet layer 24 can have a thickness in the range of about 0.0005 to 0.003 inches (about 0.01 to about 0.08 mm), optionally in the range of about 0.001 to 0.002 inches (about 0.02 to about 0.05 mm). If an outer sheet layer 24, 26 is provided on both sides of the foam core layer 22, each outer sheet layer 24, 26 can have the same or different thickness in the range of about 0.0005 to 0.003 inches (about 0.01 to about 0.08 mm), optionally in the range of about 0.001 to 0.002 inches (about 0.02 to about 0.05 mm). The foam core layer 22 can have a thickness in the range of about 0.01 to 0.06 inches (about 0.2 to about 1.5 mm), optionally 0.015 to 0.06 inches (about 0.03 to about 1.5 mm), further optionally about 0.03 to 0.04 inches (about 0.7 to about 1 mm). Optionally, the total thickness of the multi-layer sheet 20 can be within a range that is suitable for forming processes other than thermoforming, such as blow molding.

According to one aspect of the present disclosure, a high crystalline PET is used in the outer sheet layer 24 and amorphous PET is used in the foam core layer 22. Optionally, the foam core layer 22 includes about 50 to 100% of PET in-house regrind or post-consumer recycled (PCR) material.

The foam core layer 22 and the outer sheet layer 24 can include one or more additives to provide the layers 22, 24 with the desired physical and chemical properties. Non-limiting examples of suitable additives include opacifiers, colorants, fillers, nucleating agents, brighteners, etc. The additives in the foam core layer 22 and the outer sheet layer 24 can be the same or different. When the multi-layer sheet 20 includes more than one outer sheet layer 24, such as the second outer layer 26 of FIG. 2, the materials and additives in each of the outer sheet layers 24, 26 may be the same or different. The type and amount of additives in each layer can be selected to provide the layer with the desired characteristics.

The multi-layer sheet 20 includes at least one foam core layer 22 and one or more outer sheet layers 24 that have been laminated, extrusion coated, or co-extruded on one or both sides of the foam core layer 22. The terms laminated, extrusion coated, and co-extruded are used herein in accordance with the normal meaning ascribed to such terms in the art of polymeric expanded materials. Extrusion coating as used herein refers to a process in which a first layer is extruded from a die onto a second, already extruded layer, and pulled into a nip between a pressure roll and a chill roll with the pressure between the pressure roll and the chill roll forcing the first layer onto the second layer. Lamination refers to a process by which a first and second layer are formed separately and then adhered together using heat, pressure, and/or adhesives. Co-extrusion refers to a process by which a first extrudate and a second extrudate are coupled with a single die head and the first and second extrudates are extruded together through the die to form a multi-layer material.

Pre-Foam Treatment

Figure 3:
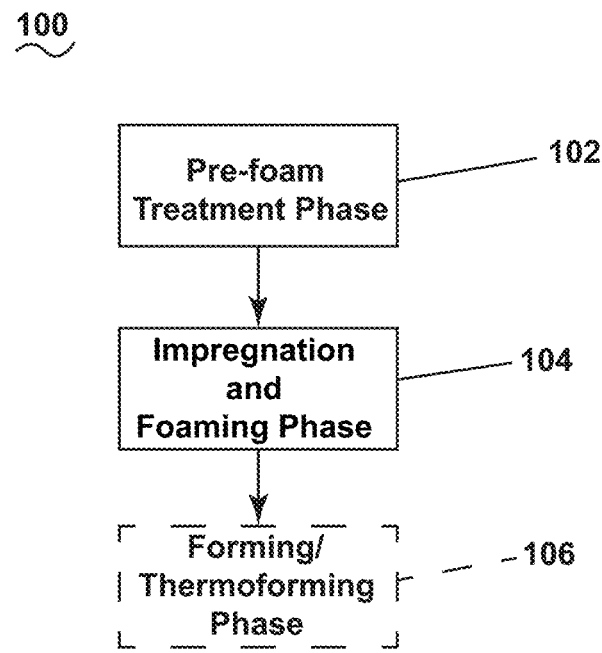
FIG. 3 is a flow chart illustrating a process for forming a multi-layer sheet according to aspects of the present disclosure.

Referring now to FIG. 3, a solid state foaming process 100 for forming a multi-layer sheet including a microcellular foam layer according to an aspect of the present disclosure is illustrated. While the solid state foaming process 100 is described in the context of the multi-layer sheet 20, the processes described herein may be used to form other single or multi-layer sheets not explicitly described herein and may proceed in a different logical order or additional or intervening steps may be included. For example, the solid state foaming process 100 can be used to form a single layer foam sheet or multiple layers of foam sheets, optionally in combination with unfoamed sheet layers.

The solid state foaming process 100 for forming the multi-layer sheet 20 having the microcellular foam core layer 22 includes a pre-foam treatment phase 102 that includes a pre-foam treatment to induce the formation of voids within the polymeric layer that forms the foam core layer 22 prior to a impregnation and foaming phase 104 in which the microcellular foam structure is formed with the layer 22 in the solid state. The impregnation and foaming phase 104 occurs will the material is in the solid state and thus the process 100 is considered a solid state foaming process. An optional forming/thermoforming phase 106 may occur subsequent to the impregnation and foaming phase 104 to form the multi-layer sheet 20 into the desired shape.

Figure 4:
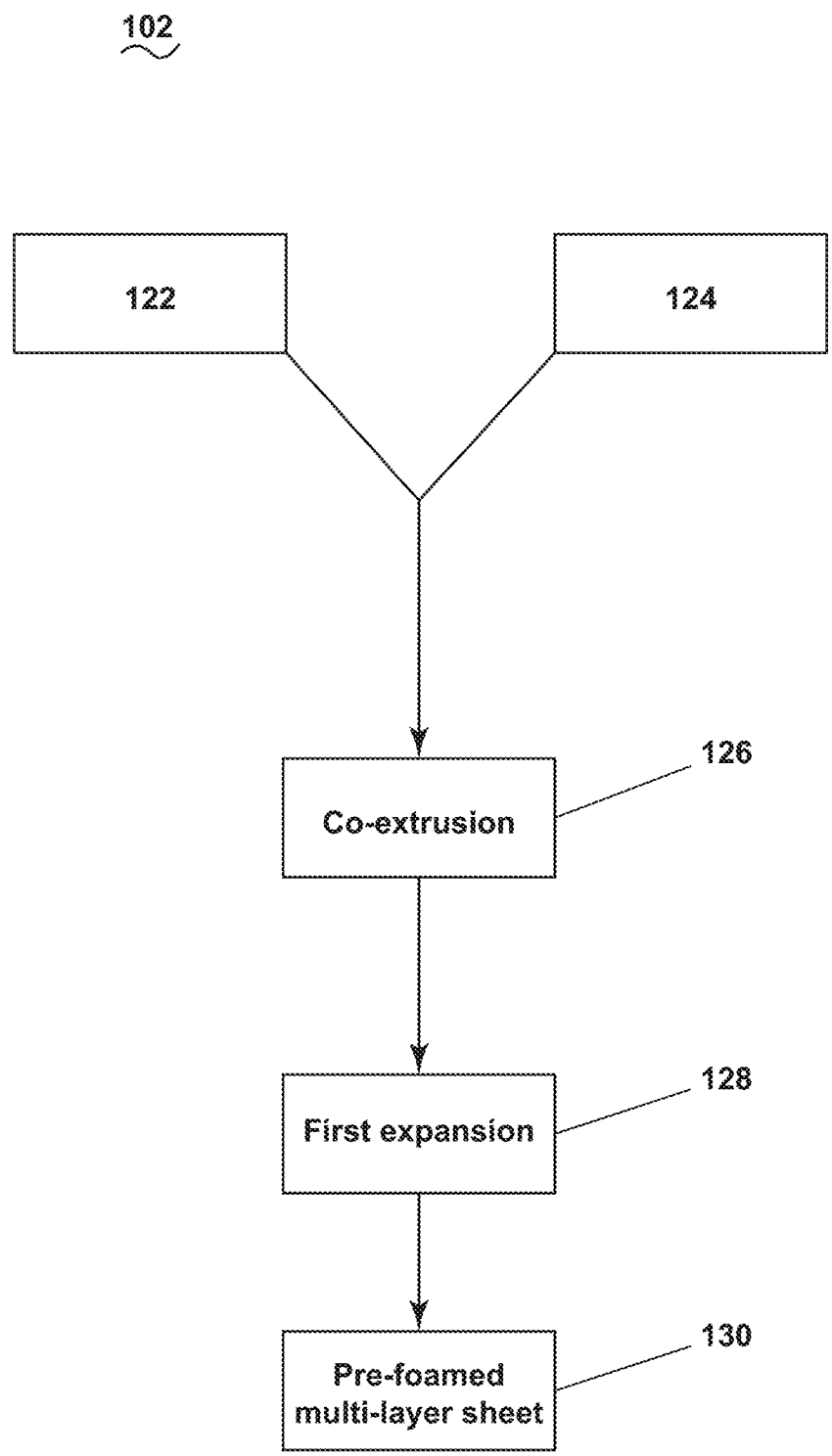
FIG. 4 is a flow chart illustrating a process for forming a multi-layer sheet according to aspects of the present disclosure.

FIG. 4 illustrates an exemplary pre-foam treatment phase 102 for forming the multi-layer sheet 20. While the pre-foam treatment phase 102 is described in the context of a co-extrusion process, the pre-foam treatment phase 102 may also be utilized in a similar manner with other processes that provide adjacent polymeric sheet layers, including a lamination process or extrusion coating process, for example. According to another aspect of the present disclosure, the pre-foam treatment phase 102 can be used in the absence of a co-extrusion, extrusion coating, or lamination process to form a single foam sheet layer of material.

At 122, a first polymeric material is combined with a blowing agent and optional additives to form a first extrusion blend that will form the foam core layer 22. At 124, a second polymeric material is optionally combined with additives to form a second extrusion blend that will form the outer sheet layer 24. The first and second extrusion blends can include a single polymer or a blend of two or more polymers, examples of which include polyethylene terephthalate (PET) including recycled PET, plant based PET, modified PET copolymer, amorphous or crystalline PET, glycol-modified (PETG), and other polyesters, as well as polyether ether ketone (PEEK), polyethylene naphthalate (PEN), polybutylene terephthalate (PBT), polymethyl methacrylate (PMMA), polyhydroxy alkanoates (PHA), polylactic acid (PLA), thermoplastic urethane (TPU), polycarbonate (PC), polystyrene (PS), polypropylene (PP), or polyethylene (PE). The polymer(s) forming the first and second polymeric materials may be the same or different. Optionally, a portion of the polymer(s) in the first and/or second extrusion blend can include a post industry or in-house regrind material or post-consumer recycled (PCR) material.

Non-limiting examples of suitable additives for inclusion in the first and/or second extrusion blends include opacifiers, colorants, fillers, nucleating agents, brighteners, etc. The additives in the first and second extrusion blends may be the same or different.

According to one aspect, the blowing agent combined with the first polymeric material includes a chemical blowing agent or a physical blowing agent. Suitable chemical blowing agents can be organic or inorganic materials that release gas upon thermal decomposition. In one example, the blowing agent includes a combination of sodium bicarbonate and citric acid, a combination of sodium citrate and calcium carbonate, or a combination of calcium distearate, limestone, and calcium oxide. In another example, the blowing agent is selected from any suitable material or combination of material that decomposes to produce carbon dioxide gas or nitrogen gas upon thermal decomposition. According to one aspect of the present disclosure, the blowing agent is a physical blowing agent, for example a directly gas injected physical blowing agent such as carbon dioxide gas or nitrogen gas.

According to one aspect, the amount of blowing agent in the first extrusion blend is in the range of about 0.1 to 5% by weight (wt. %), optionally about 0.2 to 4 wt. %, further optionally about 0.2 to 2 wt. %, and further optionally about 0.2 to 1 wt. %. According to one aspect, the amount and type of blowing agent is based on an amount that does not generate a noticeable or significant decrease (e.g. a decrease in density that is barely measureable using traditional methods) in density of the extruded layer or an amount that generates a small decrease in density that is less than the subsequent decrease in density that occurs in the following solid state impregnation and foaming phase 104. In one example, the amount and type of blowing agent is selected to provide a decrease in density of about 12% or less, optionally about 5% or less, further optionally about 3% or less, and still further optionally about 2% or less. According to one aspect of the present disclosure, the decrease in density in the solid state impregnation and foaming phase 104 is considered the primary foaming phase or primary decrease in density, with the pre-foam treatment phase 102 being considered as a minimal or incidental decrease in density prior to the primary foaming phase.

Examples of suitable commercially available blowing agents include: SUKANO® fa S632 commercially available from Sukano Polymers Corporation, U.S.A. and described by the producer as a foaming agent masterbatch in a solid polymer matrix; SAFOAM® CE-335 commercially available from REEDY Chemical Foam & Specialty Additives, U.S.A. and described by the producer as containing sodium citrate and calcium carbonate in a polyethylene carrier; and Hydrocerol 8642 commercially available from Clariant Plastics & Coating USA Inc. and described by the producer as a blowing agent including calcium distearate, limestone, and calcium oxide in an low density polyethylene (LDPE) carrier.

The first extrusion blend is heated to form a plasticated mixture or melt that is moved through a melting extruder to a heated die. A co-extruder can be joined with the heated die to provide the second extrusion blend as a melt to the heated die for co-extrusion with the first extrusion blend melt. At 126, the first and second extrusion blend melts are extruded through the heated die to form a multi-layer extrudate including a first layer formed from the first extrusion blend and a second layer formed from the second extrusion blend. Optionally, the heated die can be a flat die that produces an extrudate sheet.

The multi-layer extrudate produced at 126 can undergo a first expansion at 128 which includes heating the multi-layer extrudate to decompose the blowing agent in the first extrusion blend to generate a gas to produce voids in the first layer to form a pre-foamed layer. According to one aspect, the heat from the heated die is sufficient to decompose the blowing agent to form the pre-foamed layer as the extrudate passes through a die outlet of the heated die. Optionally, the multi-layer extrudate can be extruded to a zone of elevated temperature at 128 to facilitate decomposition of the blowing agent and forming of voids to form the pre-foamed layer.

The temperature, pressure, and the length of time that the multi-layer extrudate is heated may be based on a desired degree of expansion during the first expansion at 128. The first expansion at 128 may include a complete or partial decomposition of the blowing agent in the first extrusion blend to form voids in the pre-foamed layer. The voids in the pre-foamed layer formed at 128 can include cells, microcells, cavities, and/or channels within the pre-foamed layer that facilitate absorption of a non-reacting gas during a subsequent solid state foaming phase.

The second layer formed from the second extrusion blend forms the outer sheet layer 24 which together with the pre-foamed layer forms a pre-foamed multi-layer sheet at 130 that can be used immediately or wound on a winder for storage and later use. A cool down period may be provided in which the multi-layer sheet 130 is allowed to cool, either actively or passively, to a predetermined temperature suitable for the next intended use or suitable for storage. According to an aspect of the present disclosure, the pre-foamed multi-layer sheet formed at 130 can be treated in the impregnation and foaming phase 104 of FIG. 3 to generate a microcellular foam core layer 22 from the pre-foamed layer, which in combination with the outer sheet layer 24 forms the multi-layer sheet 20.

The outer sheet layer 24 in the pre-foamed multi-layer sheet formed at 130 may or may not have a decrease in density following the first expansion. According to one aspect of the present disclosure, the second extrusion blend which forms the outer sheet layer 24, can be free of blowing agent or include a negligible amount of blowing agent such that there is little to no decrease in the density of the outer sheet layer 24 as a result of the first expansion 128. A negligible amount of blowing agent may be present in the second extrusion blend intentionally or unintentionally. In one example, the second extrusion blend can include a small amount of the blowing agent to provide an exterior surface of the outer sheet layer 24 (i.e., the surface opposite the surface adjacent to the foam core layer 22) with a more matte-type finish compared to the glossier finish of the surface when the blowing agent is absent.

Figure 5:
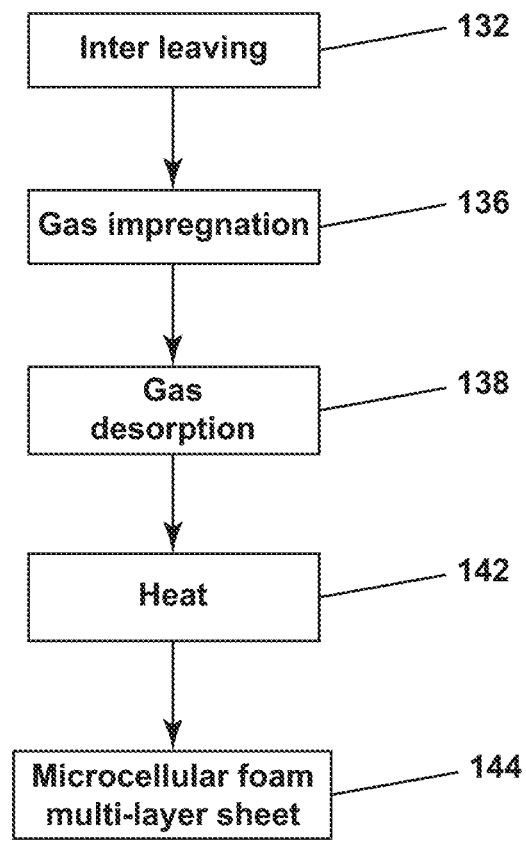
FIG. 5 is a flow chart illustrating a process for forming a multi-layer sheet according to aspects of the present disclosure.

FIG. 5 illustrates an exemplary solid state impregnation and foaming method that may be used in the impregnation and foaming phase 104 of the solid state foaming process 100 of FIG. 3 to generate a microcellular foamed layer from the pre-foamed layer formed during the pre-foam treatment phase 102 of FIG. 4. Optionally, the impregnation and foaming phase 104 can proceed according to any of the solid state foaming methods for forming a microcellular foam described in U.S. Pub. No. 2016/0229973, entitled "A METHOD FOR GENERATING A MICROSTRUCTURE IN A MATERIAL THAT INCLUDES THERMOPLASTIC POLYMER MOLECULES, AND RELATED SYSTEMS," filed Mar. 18, 2016, now U.S. Pat. No. 10,301,446, issued May 28, 2019; U.S. Pat. No. 8,568,125, entitled "ROLL FED FLOTATION/IMPINGEMENT AIR OVENS AND RELATED THERMOFORMING SYSTEMS FOR CORRUGATION-FREE HEATING AND EXPANDING OF GAS IMPREGNATED THERMOPLASTIC WEBS," issued Oct. 29, 2013; U.S. Pat. No. 10,029,401, entitled "Multi-layered Foamed Polymeric Objects and Related Methods," issued Jul. 24, 2018; U.S. Pat. No. 5,684,055, entitled "SEMI-CONTINUOUS PRODUCTION OF SOLID STATE POLYMERIC FOAMS," issued Nov. 4, 1997; U.S. Pub. No. 2015/0042005, entitled "METHOD FOR INFUSING A GAS INTO A THERMOPLASTIC MATERIAL, AND RELATED SYSTEMS," filed Aug. 28, 2014, now U.S. Pat. No. 9,914,247, issued Mar. 13, 2018;

U.S. Pat. No. 9,427,903, entitled "ROLL FED FLOTATION/IMPINGEMENT AIR OVENS AND RELATED THERMOFORMING SYSTEMS FOR CORRUGATION-FREE HEATING AND EXPANDING OF GAS IMPREGNATED THERMOPLASTIC WEBS," issued Aug. 30, 2016; U.S. Pat. No. 8,877,331, entitled "MULTI-LAYERED FOAMED POLYMERIC OBJECTS HAVING SEGMENTED AND VARYING PHYSICAL PROPERTIES AND RELATED METHODS," issued Nov. 4, 2014; U.S. Pat. No. 8,926,876, entitled "METHOD FOR MAKING SHAPEABLE MICROCELLULAR POLY LACTIC ACID ARTICLES," issued Jan. 6, 2015; U.S. Pat. No. 8,858,849, entitled "METHODS AND PRESSURE VESSELS FOR SOLID-STATE MICROCELLULAR PROCESSING OF THERMOPLASTIC ROLLS OR SHEETS," issued Oct. 14, 2014; U.S. Pub. 2010/0052201, entitled "FOAMED CELLULAR PANELS AND RELATED METHODS," filed Mar. 3, 2009, now abandoned; U.S. Pat. No. 8,377,548, entitled "MULTI-LAYERED FOAMED POLYMERIC OBJECTS AND RELATED METHODS," issued Feb. 19, 2013; U.S. Pat. No. 7,807,260, entitled "MULTI-LAYERED FOAMED POLYMERIC OBJECTS AND RELATED METHODS," ISSUED Oct. 5, 2010, all of which are herein incorporated by reference in their entirety.

A solid state foaming process refers to a process in which bubbles form and/or expand within a material to form a cellular structure while the material remains in the solid phase, without melting the material. The impregnation and foaming phase 104 is implemented to generate a microcellular foam in the pre-foamed sheet to form the foam core layer 22 of the multi-layer sheet 20.

The impregnation and foaming phase 104 optionally begins at 132 with forming a roll of the pre-foamed multi-layer sheet formed at 130 in FIG. 4 with a gas-permeable interleaving material interleaved between the layers of the pre-foamed multi-layer sheet. The gas permeable material can be in the form of a flexible material that allows gas to pass through to adjacent layers of the pre-foamed multi-layer sheet. According to one aspect of the present disclosure, the gas permeable material can be a porous paper sheet, a gauze, a mesh, or a woven or non-woven material. According to another aspect, the gas permeable material is a polypropylene-based fabric. In one example, the polypropylene-based fabric includes a polypropylene spunbonded nonwoven fabric, optionally having a density of about 50 grams per square meter.

At 136, the interleaved roll formed at 132 can be placed in a pressure vessel for impregnation of the material with a non-reacting gas that is soluble in the pre-foamed sheet to form a gas-impregnated sheet. As used herein, a non-reacting gas refers to a gas that does not react with the polymer(s) forming the pre-foamed multi-layer sheet. According to an aspect of the disclosure, the non-reacting gas may be carbon dioxide gas, nitrogen gas, or combinations thereof. Optionally, the preferred non-reacting gas for impregnating PET, PVC, and polycarbonate-based materials is carbon dioxide and the preferred non-reacting gas for impregnating polystyrene is nitrogen. The interleaved roll of the pre-foamed multi-layer sheet can be exposed to the non-reacting gas at an elevated pressure and a predetermined temperature for a time sufficient to obtain a desired concentration of gas absorbed within the pre-foamed layer and optionally the multi-layer sheet. According to one aspect the desired concentration of non-reacting gas absorbed within the pre-foamed layer is at least about 6 wt. %, optionally at least about 5 wt. %, further optionally at least about 4 wt. %, further optionally at least about 3.5 wt. %, and further optionally in the range of about 3.5 to 6 wt. %.

The concentration of gas impregnated into the pre-foamed layer effects characteristics of the microcellular foam produced in the pre-foamed layer upon nucleation and growth of non-reacting gas bubbles within the pre-foamed layer material. For example, a density of the microcellular foam produced and/or an average size of the bubbles produced can be effected by the concentration and distribution of the gas within the pre-foamed layer. The voids present in the pre-foamed layer facilitate impregnation and absorption of the non-reacting gas within the material of the pre-foamed layer such that a desired concentration and/or distribution of gas can be obtained in less time compared to a material that was not pre-treated according to the pre-foam treatment phase 102 of FIG. 4. According to one aspect, the voids in the pre-foamed layer provide a path that facilitates impregnation of the gas within the depths of the material and may optionally provide sites for cell nucleation during solid state foaming, such as during heating in the oven or during thermoforming. The pre-formed voids may optionally reduce the critical carbon dioxide concentration required for producing a low density foam.

According to one aspect of the present disclosure, gas impregnation at 136 occurs in a pressure vessel in which the pressure can be controlled. The gas impregnation is generally carried out at room temperature (around 21° C.), optionally a higher temperature may be used to accelerate diffusion of the gas into the pre-foamed layer. Optionally, rather than forming a roll with the pre-foamed multi-layer sheet and the interleaved gas permeable material, sections of pre-foamed multi-layer sheet can be stacked with the gas permeable material and then placed in the pressure vessel at 136. Further optionally, a single section of pre-foamed multi-layer sheet can be placed in the pressure vessel at 136.

The pressure and time of exposure during the gas impregnation at 136 can be based on a number of factors, including a desired density of the microcellular foam to be produced, the dimensions of the bubbles in the material, the polymer(s) forming the material, and the dimensions of the material being impregnated. According to one aspect, the pressure and time conditions for gas impregnation at 136 can be determined experimentally based on a thickness of the sheet, the polymer and gas system, the impregnation pressure, and the diffusion rate of the gas into the polymer material. Exemplary pressures during gas impregnation at 136 for a pre-foamed multi-layer sheet having a thickness within the range of about 0.014 to 0.040 inches (about 0.3 to about 1 mm) can be in the range of about 600 to 800 psi, optionally 600 to 900 psi, further optionally about 660 to 800 psi. Exemplary impregnation time periods can be in the range of about 2 to 60 hours, optionally in the range of about 2 to 46 hours, optionally about 6 to 27 hours, further optionally about 6 to 24 hours, further optionally about 6 to 8 hours, further optionally about 15 to 28 hours, and further optionally about 15 to 35 hours. According to an aspect of the present disclosure the pressure during gas impregnation at 136 is in the range of about 600 to 800 psi, optionally 600 to 900 psi, further optionally about 660 to 800 psi for a period of time in the range of about 2 to 46 hours, optionally about 6 to 27 hours, further optionally about 6 to 24 hours, further optionally about 6 to 8 hours, further optionally about 15 to 28 hours, and further optionally about 15 to 35 hours.

According to one aspect, a pre-foamed multi-layer sheet having a total thickness in the range of about 0.035 to 0.040 inches (about 0.8 to about 1 mm) can be exposed to a non-reacting gas in a pressure vessel at 660 to 800 psi for about 15 to 35 hours. A sheet having a thickness of about 0.035 to 0.040 inches (about 0.8 to about 1 mm) is a typical thickness used for thermoforming cups. In contrast, all other conditions being the same, a multi-layer sheet not treated according to the pre-foam phase 102 would be exposed to the non-reacting gas for 36 to 48 hours to obtain a comparable level of gas impregnation, while also having a higher density.

Optionally, following the gas impregnation phase 136 (also referred to as the soaking phase), the process can include a holding phase, also referred to as a cap, in which the pressure in the pressure vessel is held at a secondary holding pressure following the impregnation phase 136. The cap can be conducted at a secondary holding pressure that is the same as the pressure during the impregnation phase, optionally greater than the pressure during the impregnation phase. The extended period of time in the pressure vessel at an elevated pressure can facilitate distribution of the non-reacting gas through the material before ramping the pressure back down to atmospheric pressure. Optionally, the cap phase may accelerate the sorption speed and facilitate reaching the peak carbon dioxide saturation concentration of the sorption curve quicker before the crystallization speed takes charge ($CO_2$ also induces crystallization). During the gas impregnation phase, sufficient gas concentration can reduce the glass transition temperature (Tg) of saturated PET due to a plasticizing effect of the absorbed $CO_2$. The pressure during the cap phase can also facilitate generating a multi-layer microstructure of foamed cells.

Following the gas impregnation phase at 136, the gas impregnated sheet can undergo a gas desorption phase at 138 in which a portion of the gas impregnated in the sheet is allowed to diffuse out of the sheet. According to one aspect, the gas desorption phase at 138 occurs at a reduced pressure and/or a reduced temperature compared to the gas impregnation at 136. In one example, the gas desorption phase 138 proceeds at atmospheric pressure and temperatures less than about −6° C., optionally less than about −12° C. The sheet can be stored at the reduced temperature for a predetermined period of time, such as about 1 or more hours, optionally about 1 to 24 hours, further optionally about 4 to 24 hours. According to one aspect of the present disclosure, following the gas desorption phase at 138, a concentration of non-reacting gas remaining within the pre-foamed layer is at least about 6 wt. %, optionally at least about 5 wt. %, further optionally at least about 4 wt. %, further optionally at least about 3.5 wt. %, and further optionally in the range of about 3.5 to 6 wt. %.

In one aspect, after desorption, the gas concentration in the exterior surface of the outer sheet layer 24 is reduced, optionally to a small or negligible amount. When the outer sheet layer 24 is free of a blowing agent in the pre-foam phase, the lack (or negligible amount) of gas in the outer sheet layer 24 can provide a surface that is solid in appearance with a glossy, smooth surface finish.

When the outer sheet layer 24 is formed using a pre-foam phase in which a blowing agent is present in the outer sheet layer 24, the surface of the outer sheet layer 24 can be matte in appearance due to the presence of voids generated during decomposition of the blowing agent. According to one aspect, the outer layer is formed using an extrusion blend that includes a blowing agent in the range of about 0.1 to 5 wt. %.

Following the gas desorption phase at 138, the gas impregnated sheet is heated at 142 to initiate foaming (also referred to as bubble formation or expansion) to induce formation of a microcellular foam at 144 in the pre-foamed sheet and produce the multi-layer sheet 20. This phase may also be considered the second expansion of the pre-foamed layer that ultimately forms the foam core layer 22 having a microcellular foam structure. The pre-foamed layer can be partially or completely expanded. Optionally, heating to initiate foaming includes stretching the sheet. Optionally, the outer sheet layer 24 may be partially expanded, depending on the concentration of gas present in the outer sheet layer 24.

If the gas impregnated sheet is wound in a roll with the interleave material, the sheet is first unwound and separated from the interleave material prior to heating at 142. Heating to initiate foaming can occur using any suitable heat system, examples of which include a hot water bath, a hot oil bath, an infrared heater, and a heated air oven. The gas impregnated sheet is heated to initiate bubble formation, but is not heated so as to melt the polymeric material forming the sheet.

According to one aspect, heating at 142 occurs in a floating air oven in which nozzles disposed above and below the gas impregnated sheet supply heated air to the sheet. As the gas impregnated sheet is heated within the floating air oven, the sheet is allowed to expand in all three dimensions of length, width, and thickness. In one aspect, the sheet expands in the width dimension by about 15 to 45%, optionally 20 to 25%, and in the thickness dimension by about 30 to 70%, optionally about 35 to 55%. According to another aspect, expansion as the microcellular foam is formed at 144 reduces a density of the sheet by about 35 to 65%, optionally about 40 to 55%, and further optionally about 40 to 50%.

Following formation of the microcellular foam multi-layer sheet at 144, the sheet may be formed/thermoformed at 106 of the solid state foaming process 100 of FIG. 3 or stored for later use. According to one aspect of the disclosure, the microcellular foam multi-layer sheet is exposed to a cooling station following foaming to cool the sheet and to stop bubble nucleation and growth. The optional cooling station can include a cold water bath, a set of chilled rollers, or chilled air, for example.

Optionally, following the heating at 142, or concurrent with the heating, the microcellular foam multi-layer sheet can be formed or thermoformed at 106 of the solid state foaming process 100 of FIG. 3 to form the sheet into the desired shape. According to one aspect, the microcellular foam multi-layer sheet is cold formed. According to another aspect, the microcellular foam multi-layer sheet is heated in a thermoforming process to soften the sheet before and/or during forming the sheet around a mold.

In one aspect, the microcellular foam multi-layer sheet can be formed into an article, such as a food or beverage container or a lid for such a container, having the desired shape and dimensions by thermoforming. Non-limiting examples of thermoforming can include vacuum molding, pressure molding, plug-assist molding, and vacuum snap-back molding. The thermoforming process can include heating the microcellular foam multi-layer sheet (also referred to as a web) to a thermoforming temperature to soften the sheet and then stretching or drawing the sheet over a mold. The material can be maintained over the mold as the material cools and solidifies to form the article. The formed article can then be trimmed from the thermoformed sheet and removed from the mold. Optionally, the trimmed material is reground and processed for further use as regrind, alone or in combination with virgin material.

According to one aspect, the pre-foamed multi-layer sheet undergoes a third expansion during thermoforming that is initiated by the heat supplied in the thermoforming process. Heat for facilitating molding of the sheet during thermoforming can be supplied in any suitable manner, examples of which include radiant heat and heated air. Optionally, the mold and/or corresponding mold cavity is heated to facilitate molding the pre-foamed multi-layer sheet. The heated mold/cavity can crystallize the polymeric-base of the pre-foamed multi-layer sheet, such as PET, to facilitate forming articles having sufficient heat resistance for hot food service applications.

The heat in the thermoforming process induces additional expansion of the gas within the pre-foamed multi-layer sheet during the third expansion such that the formed article has a density that is less than the pre-foamed multi-layer sheet. In one aspect, a density of the formed articles is reduced compared to the pre-foamed multi-layer sheet by about 65 to 92%, optionally about 65 to 85%, further optionally about 75 to 92%.

Optionally, the thermoforming process includes blowing air onto the sheet to facilitating pressing the sheet about the mold. In another example, the thermoforming process can include vacuum molding in which the sheet is forced against the mold by a vacuum.

Without being limited by a particular theory, it is believed that introducing a blowing agent into the first extrusion blend, which ultimately forms the microcellular foam core layer, generates voids within the layer during the first expansion 128 in the pre-foam treatment phase 102. These voids may have any regular or irregular shape and may be in the form of channels, bubbles, cavities, cells, etc. These voids in the pre-foamed layer may facilitate absorption of the non-reacting gas within the layer during gas impregnation at 136 of the solid state foam foaming phase 104, and particularly facilitate absorption of the non-reacting gas into the interior and center regions of the layer. Generally, impregnation of the non-reacting gas within the interior and center regions of the layer takes longer than the exterior or surface regions of the layer, resulting in a gas concentration gradient of absorbed non-reacting gas in which the region of lowest concentration is near the center of the layer after saturation in a pressure vessel.

Optionally, a portion of the gas generated by the decomposition of the blowing agent in the first expansion 128 of the pre-foamed layer may be distributed and retained within the material, thus requiring less gas to be added during gas impregnation at 136 of the impregnation and foaming phase 104 to reach a desired non-reacting gas concentration. The presence of some amount of gas prior to gas impregnation at 136 can also contribute to decreasing the amount of time required to achieve a predetermined gas absorption concentration during solid state foaming. Optionally, the presence of voids prior to gas impregnation at 136 can facilitate an increase in the reduction of the foam density of the final article as a result of the nucleation effect of the pre-foam phase blowing agent.

During gas impregnation at 136 of the impregnation and foaming phase 104, the non-reacting gas may be absorbed into the outer sheet layer 24 and thus there may some amount of foaming in the outer sheet layer 24. The amount of foaming in the outer sheet layer 24 may also be effected by whether or not the second extrusion blend that ultimately forms the outer sheet layer 24 includes a blowing agent. In addition, in most cases, the non-reacting gas will desorb from the outer sheet layer 24 faster than the core layer 22 during the gas desorption phase 138 and thus the concentration of gas in the outer sheet layer 24 will be reduced, leaving little to no absorbed carbon dioxide within the outer sheet layer 24 following the desorption at 138, depending on the desorption time. Generally speaking, the degree of foaming, if any, of the outer sheet layer 24 will be less than that of the foamed core layer 22, optionally having a smaller and/or finer cell size than that of the foamed core layer 22, and the density of the outer sheet layer 24 will be greater than that of the foamed core layer 22.

EXAMPLES

Example 1

Multi-layer sheets were made including a PET microcellular foam layer according to the solid state foaming process 100 of FIG. 3 with and without the pre-foam treatment phase 102. The pre-foam treated sheets were made using a blend that includes PET and 1-2 wt. % SUKANO® fa S632 as a chemical blowing agent. The sheets had a thickness in the range of 0.035 to 0.040 inches (about 0.8 to about 1 mm). Both the pre-foam treatment sheets and the untreated sheets were exposed to carbon dioxide gas at 660 psi. The untreated sheets were exposed to the carbon dioxide gas for 36-40 hours to achieve a predetermined amount of carbon dioxide absorption while the pre-foam treatment sheets were exposed to carbon dioxide gas for 15-20 hours to achieve a similar amount of carbon dioxide absorption.

Example 2

PET microcellular foam sheets were made according to the solid state foaming process 100 of FIG. 3 with and without the pre-foam treatment phase 102. The pre-foam treated sheets were made using a blend that included 1 wt. % SUKANO® fa S632 chemical blowing agent according to the present disclosure. The pre-foam treatment sheets had a thickness of 0.018 inches (about 0.46 mm) while the untreated sheets had a thickness of 0.014 inches (about 0.46 mm). The pre-foam treatment sheets were capable of achieving a 90% reduction in density upon foaming whereas the untreated sheets were foamed with only a 60% reduction in density.

Example 3

Figure 6:
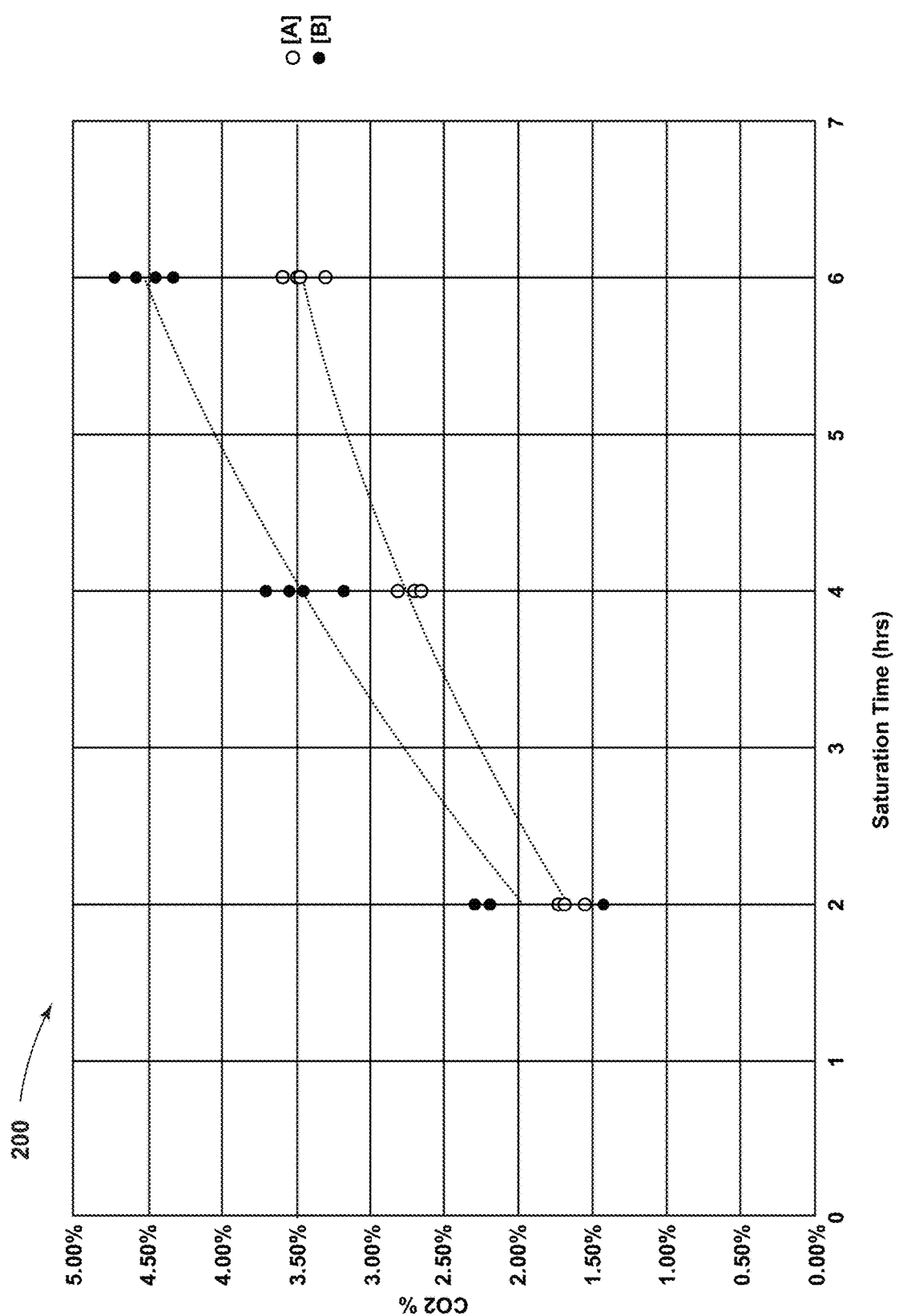
FIG. 6 illustrates a graph of gas absorption as a function of time according to aspects of the present disclosure.

FIG. 6 illustrates a graph 200 demonstrating the effect of the pre-foam treatment phase 102 according to the present disclosure on the amount of carbon dioxide absorbed by the material during gas impregnation in the impregnation and foaming phase 104 of the solid state foaming process 100 of FIG. 3. Data points [A] illustrate the amount of carbon dioxide absorbed by a PET sheet that was not treated according to the pre-foam treatment ("untreated sheet"). Data points [B] illustrate the amount of carbon dioxide absorbed by a PET sheet made according to the same conditions as the untreated sheets [A] except for the addition of the pre-foam treatment phase 102 of FIG. 3 ("pre-foam treated sheets"). The pre-foam treated sheets were made using a PET blend that includes PET and 2 wt. % SUKANO® fa S632 as a chemical blowing agent. The dashed lines indicate a least squares regression line for each data set [A] and [B].

The graph of FIG. 6 illustrates the amount of carbon dioxide gas absorbed by PET sheets having a thickness of 0.014 inches (about 0.36 mm) as a function of time at 600 psi and 21° C. in a pressure vessel. As shown in the graph 200, the amount of carbon dioxide absorbed by the treated sheets [B] at a given time is consistently greater than the carbon dioxide absorbed by the untreated sheets [A] at the same time.

Figure 7:
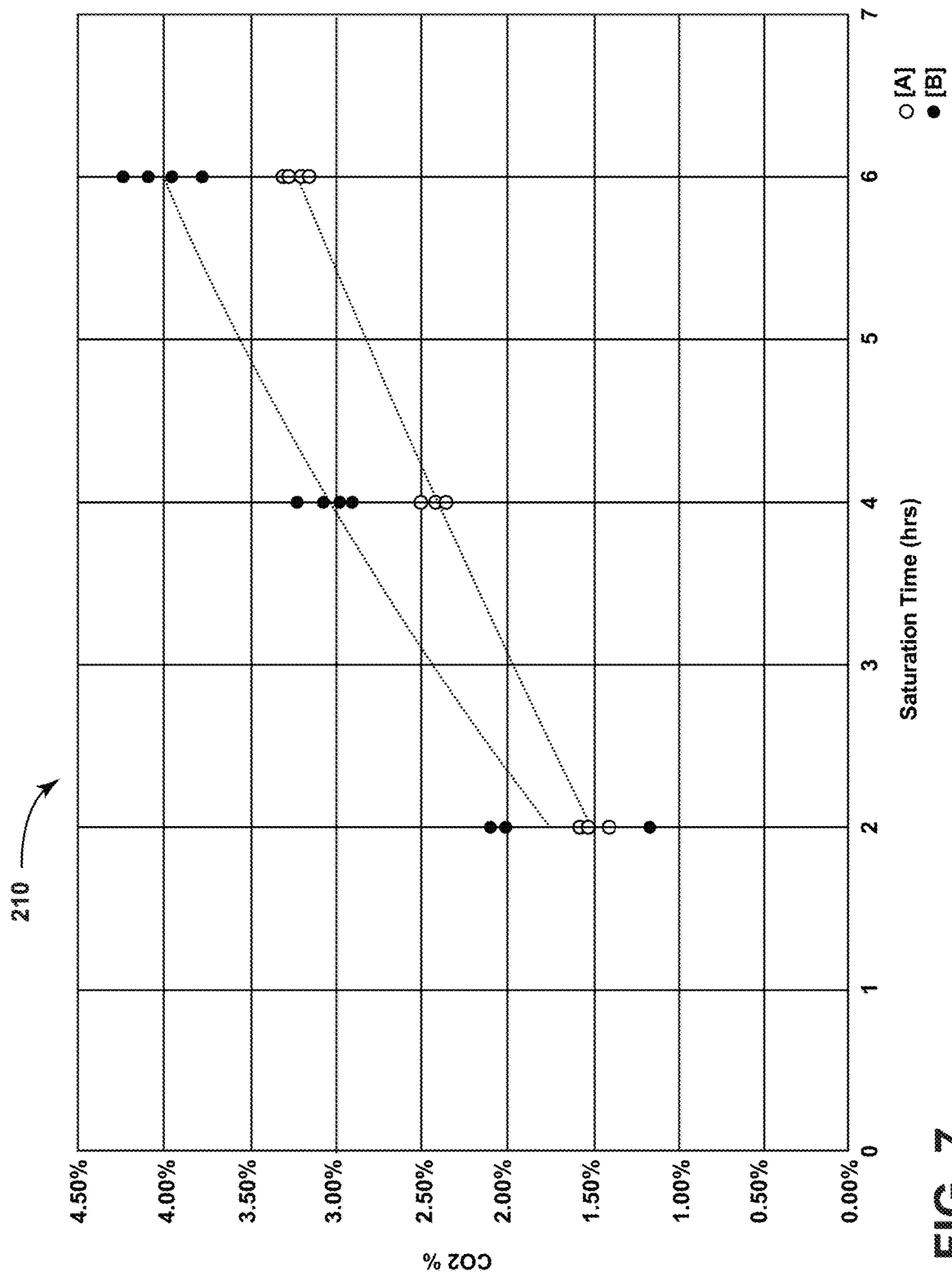
FIG. 7 illustrates a graph of gas absorption for the sheets of FIG. 6 following a desorption phase according to aspects of the present disclosure.

FIG. 7 illustrates a graph 210 illustrating the amount of carbon dioxide retained by the untreated PET sheets [A] and the treated PET sheets [B] for each saturation time shown in FIG. 6. The dashed lines indicate a least squares regression line for each data set [A] and [B]. Following the gas impregnation portion of the impregnation and foaming phase 104 of the solid state foaming process 100, the untreated and treated PET sheets were stored for 1 hour in a freezer during the gas desorption phase. Unless otherwise specified, the temperature in the freezer is about −5° C. (about 23° F.). The sheets were removed from the freezer and the amount of carbon dioxide retained by the sheets over time was measured. As demonstrated in graph 210, at each measured time point subsequent to the desorption phase, the pre-foam treated PET sheets [B] retain a greater amount of carbon dioxide gas compared to the untreated PET sheets [A].

Figure 8:
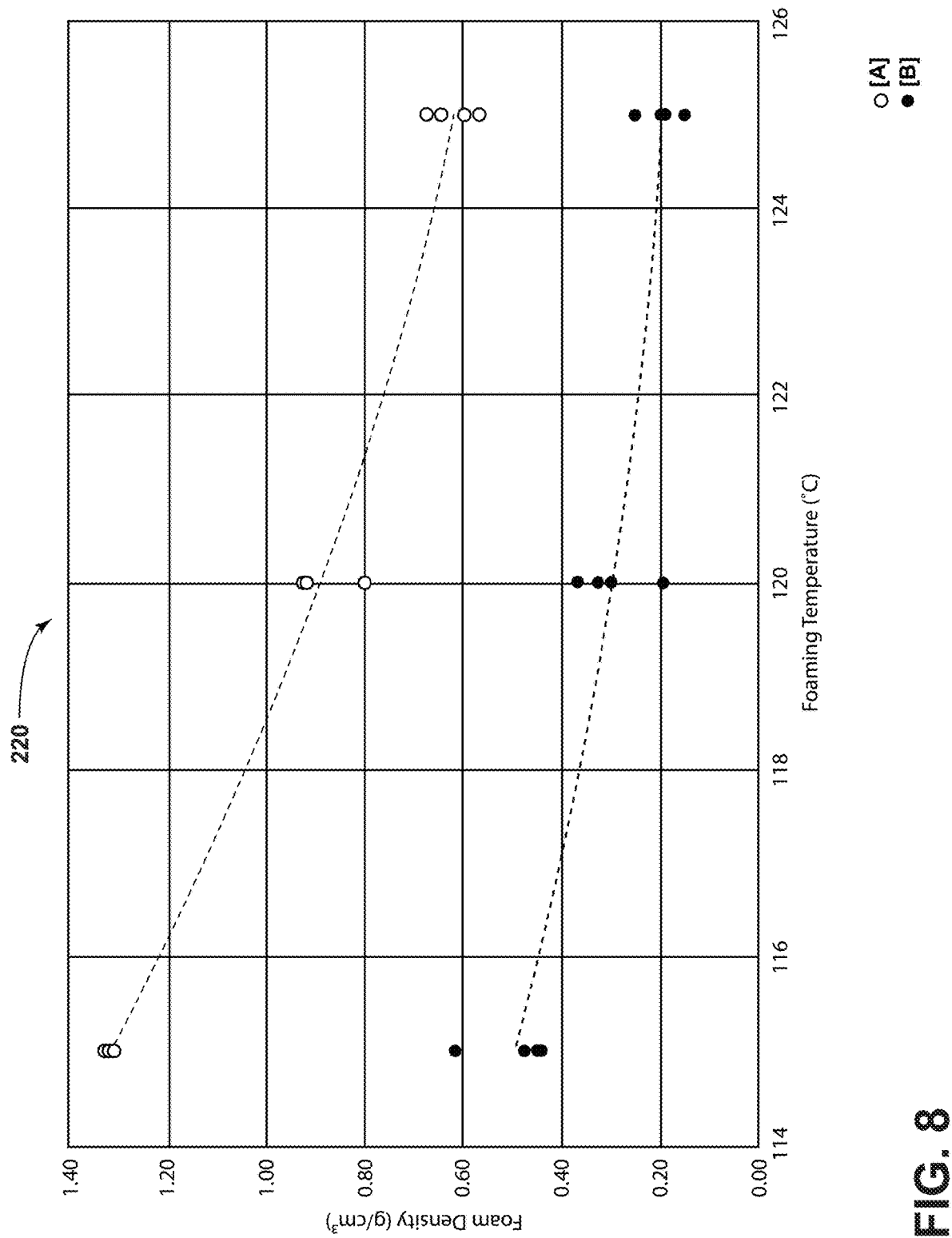
FIG. 8 illustrates a graph of density as a function of temperature for the sheets of FIG. 6 according to aspects of the present disclosure.

FIG. 8 illustrates a graph 220 comparing the density of a microcellular foamed sheet formed from the untreated PET sheets [A] and the pre-foam treated PET sheets [B]. The graph 220 illustrates the density of the foamed sheets as a function of the foaming temperature during solid state foaming. The dashed lines indicate a least squares regression line for each data set [A] and [B]. The untreated PET and pre-foam treated PET sheets [A] and [B] were heated to the indicated temperature in a floating air oven to the initiate foaming of the sheets as a result of the expansion of the impregnated carbon dioxide gas. The graph 220 demonstrates that the pre-foam treated PET sheets [B] consistently have a lower density after foaming compared to the untreated PET sheets [A]. The combination of the pre-foam treatment phase 102 with the impregnation and foaming phase 104 of the solid state foaming process 100 of FIG. 3 according to the present disclosure can produce microcellular foam sheets having a lower density than sheets formed using the impregnation and foaming phase 104 alone without the pre-foam treatment phase 102. Thus, according to an aspect of the present disclosure, a microcellular foam sheet treated according to the pre-foam treatment phase 102 has a density less than 1 g/cm$^3$, and specifically less than 0.8 g/cm$^3$, as shown in the embodiment of Example 3. This is in contrast to an untreated sheet having a density greater than 1 g/cm$^3$.

Example 4

Figure 9:
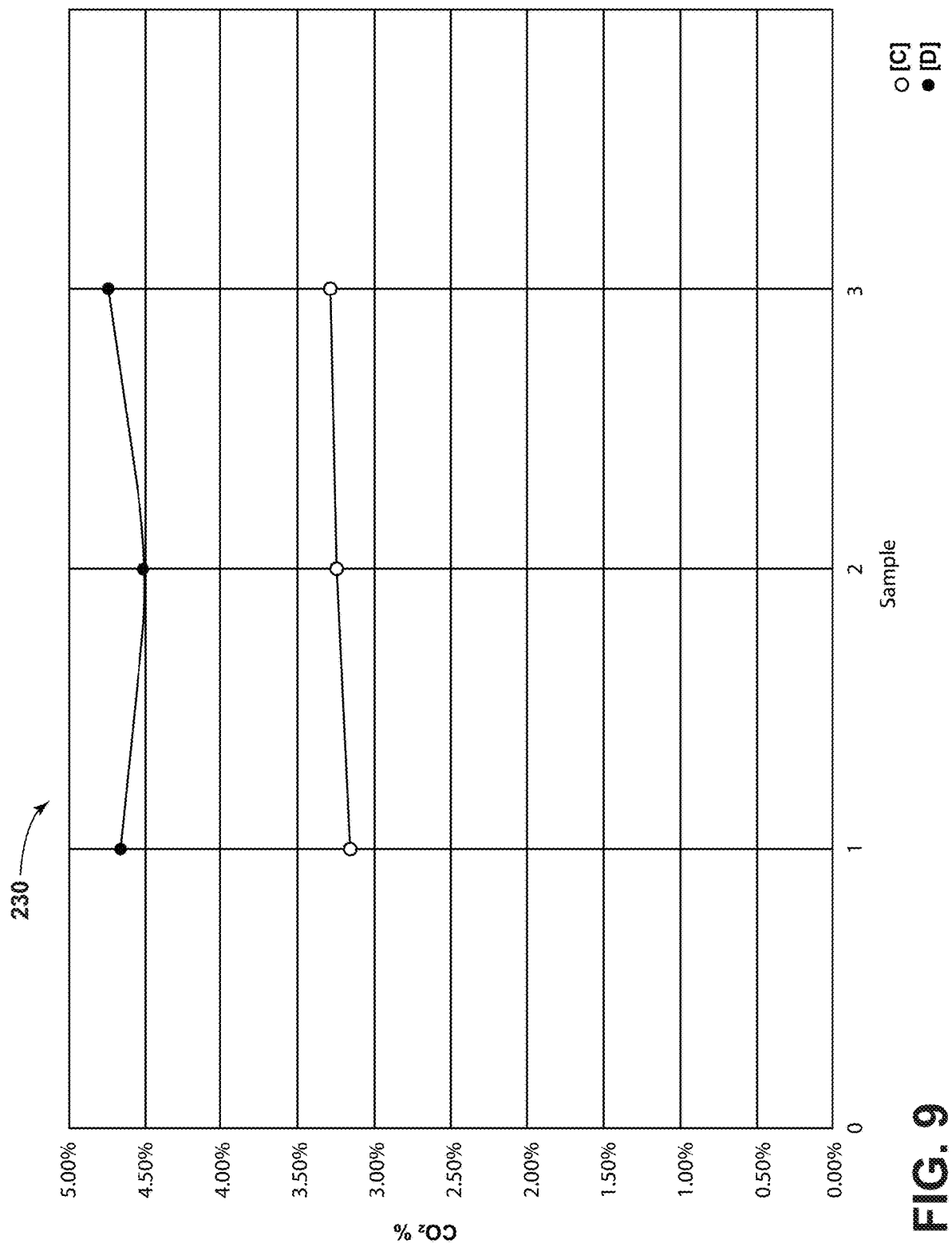
FIG. 9 illustrates a graph comparing gas absorption of microcellular foam sheets according to aspects of the present disclosure and conventional microcellular foam sheets.

FIG. 9 illustrates a graph 230 demonstrating the effect of the pre-foam treatment phase 102 according to the present disclosure on the amount of carbon dioxide absorbed by the material during the impregnation and foaming phase 104 of the solid state foaming process 100 of FIG. 3. Data points [C] illustrate the amount of carbon dioxide absorbed by a PET sheet that was not treated according to the pre-foam treatment ("untreated sheet"). Data points [D] illustrate the amount of carbon dioxide absorbed by a PET sheet made according to the same conditions as the untreated sheets [C] except for the addition of the pre-foam treatment phase ("pre-foam treated sheets"). The pre-foam treated sheets were made using a blend that includes PET and 2 wt. % SUKANO® fa S632 as a chemical blowing agent. The solid lines connecting the data points are provided for visual emphasis only. The untreated and pre-foam treated sheets [C] and [D] were exposed to carbon dioxide in a pressure vessel at 700 psi for 5 hours. The sheets were made from PET and had a thickness of 0.019 inches (about 0.48 mm). Graph 230 illustrates that the pre-foam treated sheets [D] consistently absorbed a greater amount of carbon dioxide than the untreated sheets [C] under the same impregnation and foaming conditions.

Example 5

Figure 10:
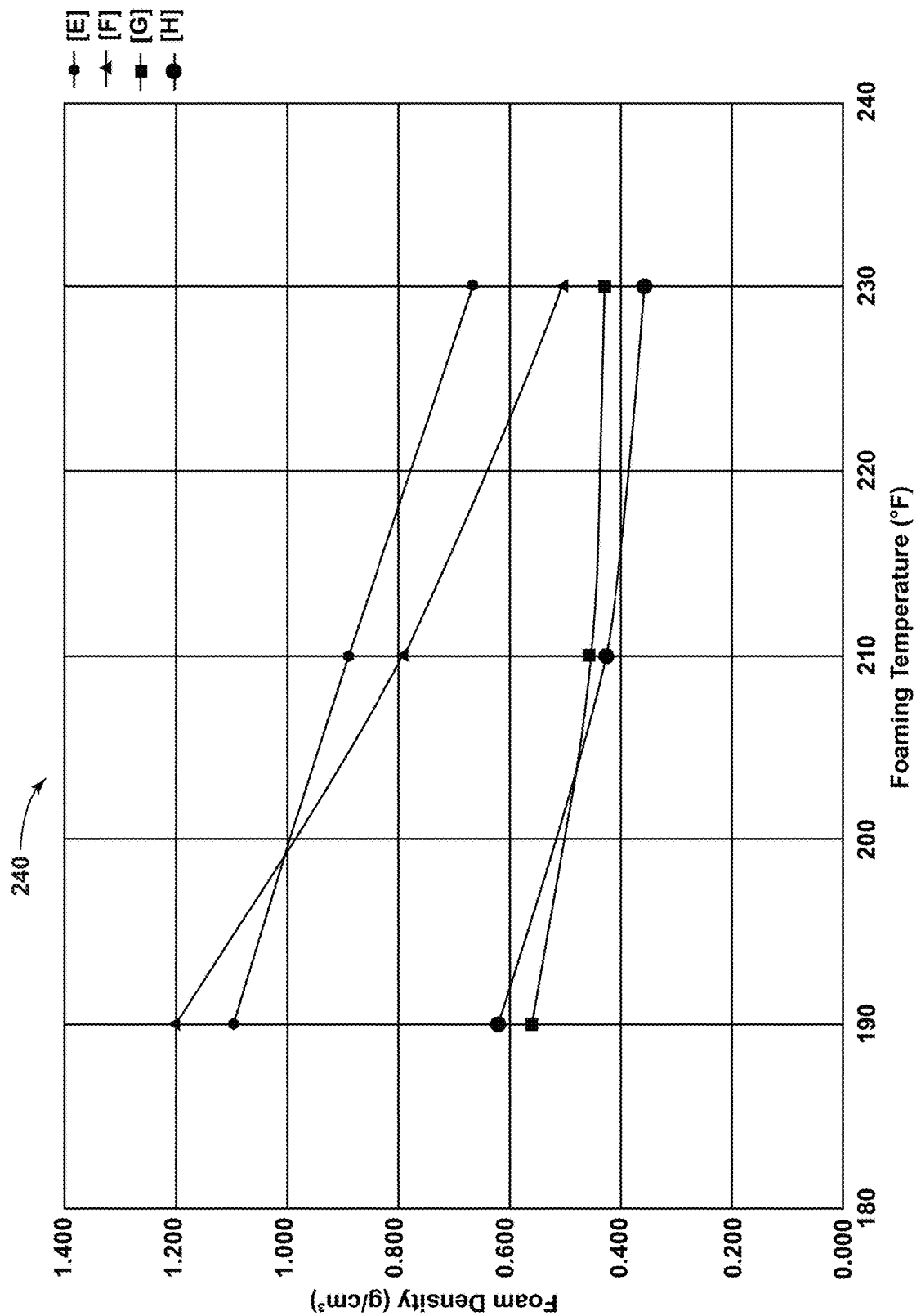
FIG. 10 illustrates a graph of density as a function of temperature according to aspects of the present disclosure.

FIG. 10 illustrates a graph 240 illustrating the effect of the pre-foam treatment phase 102 according to the present disclosure on the density of the microcellular foam formed in the solid state foaming process 100. Table 1 lists the parameters for each of the samples [E] through [H] investigated.

TABLE 1

| Sample [E] through [H] treatment. | | | |
|---|---|---|---|
| Sample | Pre-foam Treatment | Solid State Foaming | Sheet Thickness (inches/mm) |
| [E] | — | CO$_2$ at 700 psi, 5 hours | 0.019 in./0.48 mm |
| [F] | — | CO$_2$ at 700 psi, 5 hours | 0.014 in./0.036 mm |
| [G] | 2 wt. % SUKANO® fa S632 | CO$_2$ at 700 psi, 5 hours | 0.019 in./0.48 mm |
| [H] | 2 wt. % SUKANO® fa S632 | CO$_2$ at 700 psi, 5 hours | 0.022 in./0.56 mm |

Data points [E] and [F] illustrate the amount of carbon dioxide absorbed by a PET sheet that was not treated according to the pre-foam treatment ("untreated sheet"). Data points [G] and [H] illustrate the amount of carbon dioxide absorbed by a PET sheet made according to the same conditions as the untreated sheets [E] and [F] except for the addition of the pre-foam treatment phase ("pre-foam treated sheets"). The solid lines connecting the data points are provided for visual emphasis only.

The graph 240 illustrates the density of the foamed sheets as a function of the foaming temperature. The untreated PET sheets [E] and [F] and the pre-foam treated PET sheets [G] and [H] were heated to the indicated temperature in a floating air oven to initiate foaming of the sheets as a result of the expansion of the impregnated carbon dioxide gas. The graph 240 demonstrates that the pre-foam treated PET sheets [G] and [H] consistently have a lower density after solid state foaming compared to the untreated PET sheets [E] and [F], even when the pre-foam treated sheet has a greater thickness than the untreated sheet. For example, pre-foam treated PET sheet [H] has a thickness of 0.022 inches (0.56 mm) and has a lower foam density than the untreated sheets [E] and [F] which both have a smaller thickness. The combination of the pre-foam treatment phase 102 with the impregnation and foaming phase 104 in the solid state foaming process 100 according to the present disclosure can produce microcellular foam sheets having a lower density than sheets formed using a conventional solid state foaming process that does not include the pre-foam treatment phase 102. Thus, according to an aspect of the present disclosure, a microcellular foam sheet treated according to the pre-foam treatment phase 102 can have a density less than 1 g/cm$^3$, and specifically less than 0.8 g/cm$^3$, as shown in the embodiment of Example 5. This is in contrast to an untreated sheet having a density greater than 1 g/cm$^3$.

Example 6

Figure 11:
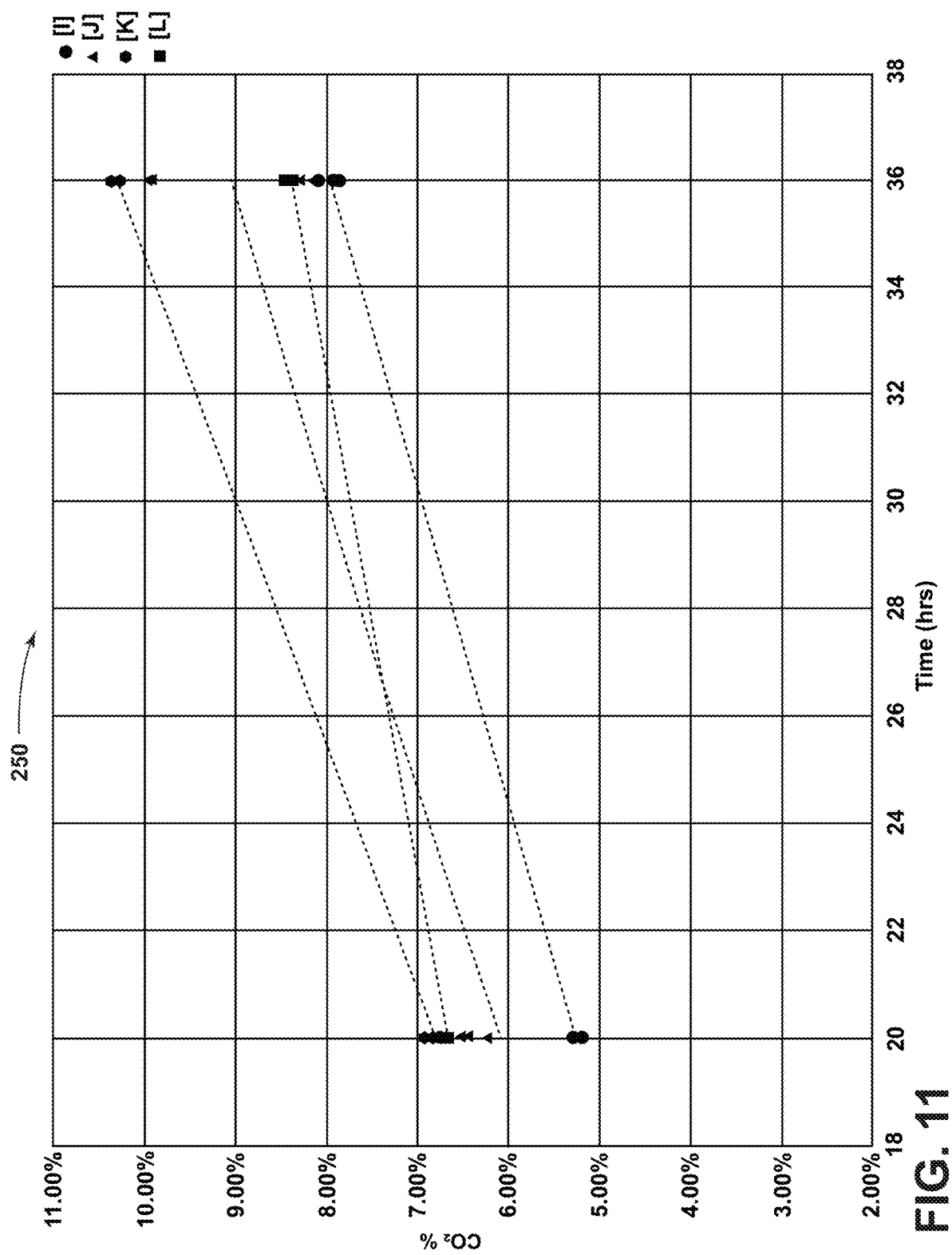
FIG. 11 illustrates a graph of gas absorption as a function of gas impregnation cycle time according to aspects of the present disclosure.
Figure 12:
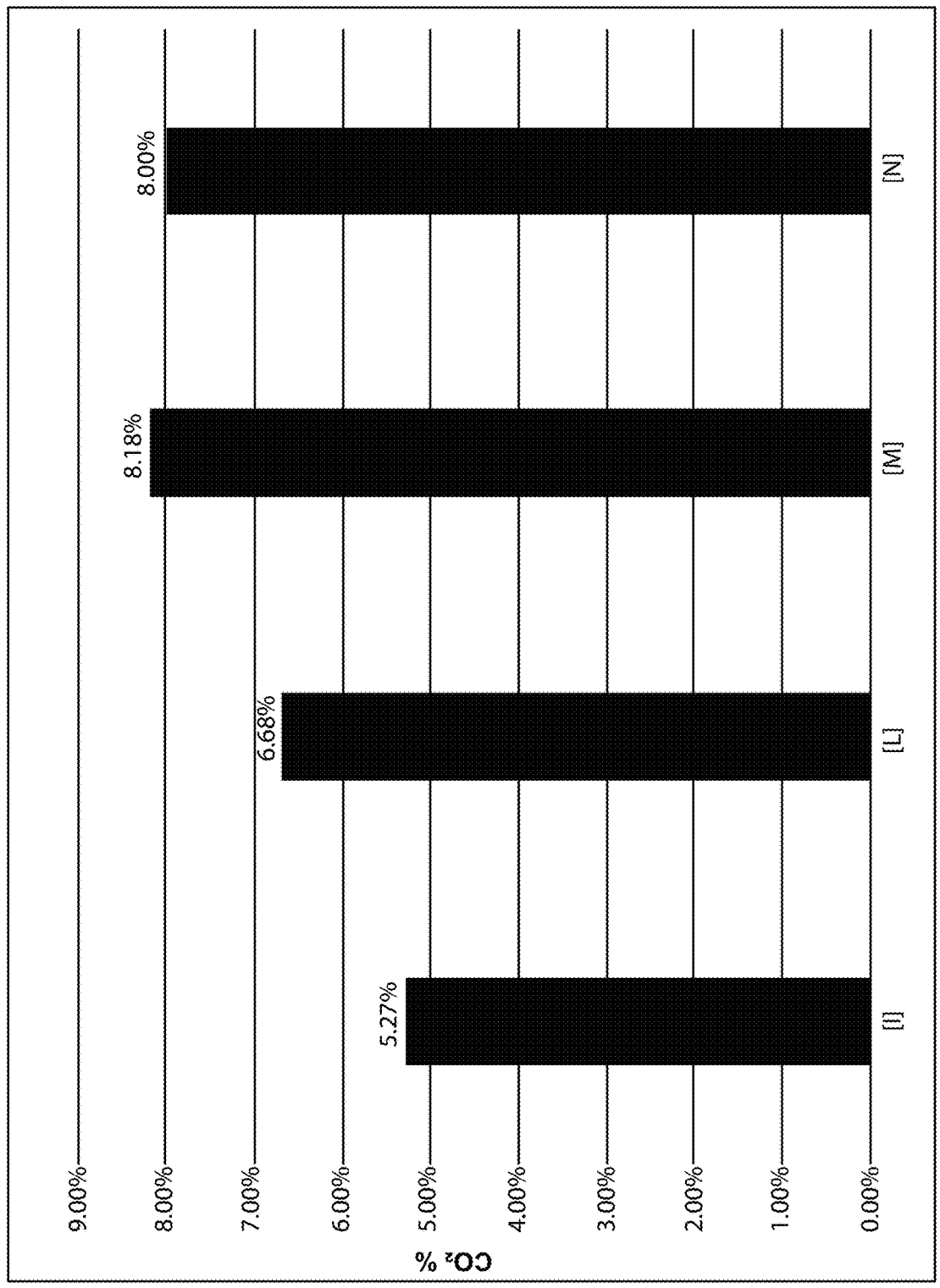
FIG. 12 illustrates a graph of the final gas absorption of exemplary microcellular foam sheets formed according to aspects of the present disclosure.

FIGS. 11 and 12 illustrate graphs 250 and 260 demonstrating the effect of the pre-foam treatment phase 102 according to the present disclosure on the amount of carbon dioxide absorbed by the material during gas impregnation in the impregnation and foaming phase 104. Table 2 below lists the parameters for each the samples [I] through [N] investigated.

TABLE 2

Sample [I] through [L] treatment.

| Sample | Polymer | Pre-foam Treatment | Thickness (inches)/(mm) |
|---|---|---|---|
| [I] | PET | — | 0.040 in./1.0 mm |
| [J] | PET | 0.5 wt. % SAFOAM® CE-335 | 0.0350-0.040 in./0.89-1.0 mm |
| [K] | PET | 1 wt. % SAFOAM® CE-335 | 0.0350-0.040 in./0.89-1.0 mm |
| [L] | PET | 1 wt. % SUKANO® fa S632 | 0.0350-0.040 in./0.89-1.0 mm |
| [M] | PET | 2 wt. % SUKANO® fa S632 | 0.0350-0.040 in./0.89-1.0 mm |
| [N] | PET | 4 wt. % SUKANO® fa S632 | 0.0350-0.040 in./0.89-1.0 mm |

SUKANO® fa S632 is commercially available from Sukano Polymers Corporation, U.S.A. and is described by the producer as a foaming agent masterbatch in a solid polymer matrix. SAFOAM® CE-335 is commercially available from REEDY Chemical Foam & Specialty Additives, U.S.A. and is described by the producer as containing sodium citrate and calcium carbonate in a polyethylene carrier. The PET is an extrusion thermoforming grade PET having an intrinsic viscosity in the range of about 0.6-0.84 dL/g per ASTM 4603.

Data points [I] illustrate the amount of carbon dioxide absorbed by a PET sheet that was not treated according to the pre-foam treatment ("untreated sheet"). Data points [J], [K], [L], [M], and [N] illustrate the amount of carbon dioxide absorbed by a PET sheet made according to the same conditions as the untreated sheets [I] except for the addition of the pre-foam treatment phase ("pre-foam treated sheets"). All of the samples [I] through [N] were exposed to carbon dioxide at 660 psi in a pressure vessel for the time periods indicated in the graph 250 of FIG. 11, followed by a 4 hour cap at 720 psi. The dashed lines in FIG. 11 indicate a least squares regression line for each data set [I] through [L]. The bar graph 260 of FIG. 12 compares the amount of carbon dioxide absorbed after 20 hours of exposure, followed by a 4 hour cap at 720 psi, for untreated sample [I] and pre-foam treated samples [L], [M], and [N].

The data in FIGS. 11 and 12 illustrate the effect of different types and concentrations of chemical blowing agents in the pre-foam treatment phase 102 on the amount of carbon dioxide absorbed during the impregnation portion of the impregnation and foaming phase 104 of the solid state foaming process 100. Both the SUKANO® fa S632 and the SAFOAM® CE-335 blowing agents, at concentrations ranging from 0.5 to 4 wt. % result in an increase in carbon dioxide absorption during solid state foaming compared to samples made according to the same process without the addition of the blowing agent in a pre-foam treatment process.

Figure 13:
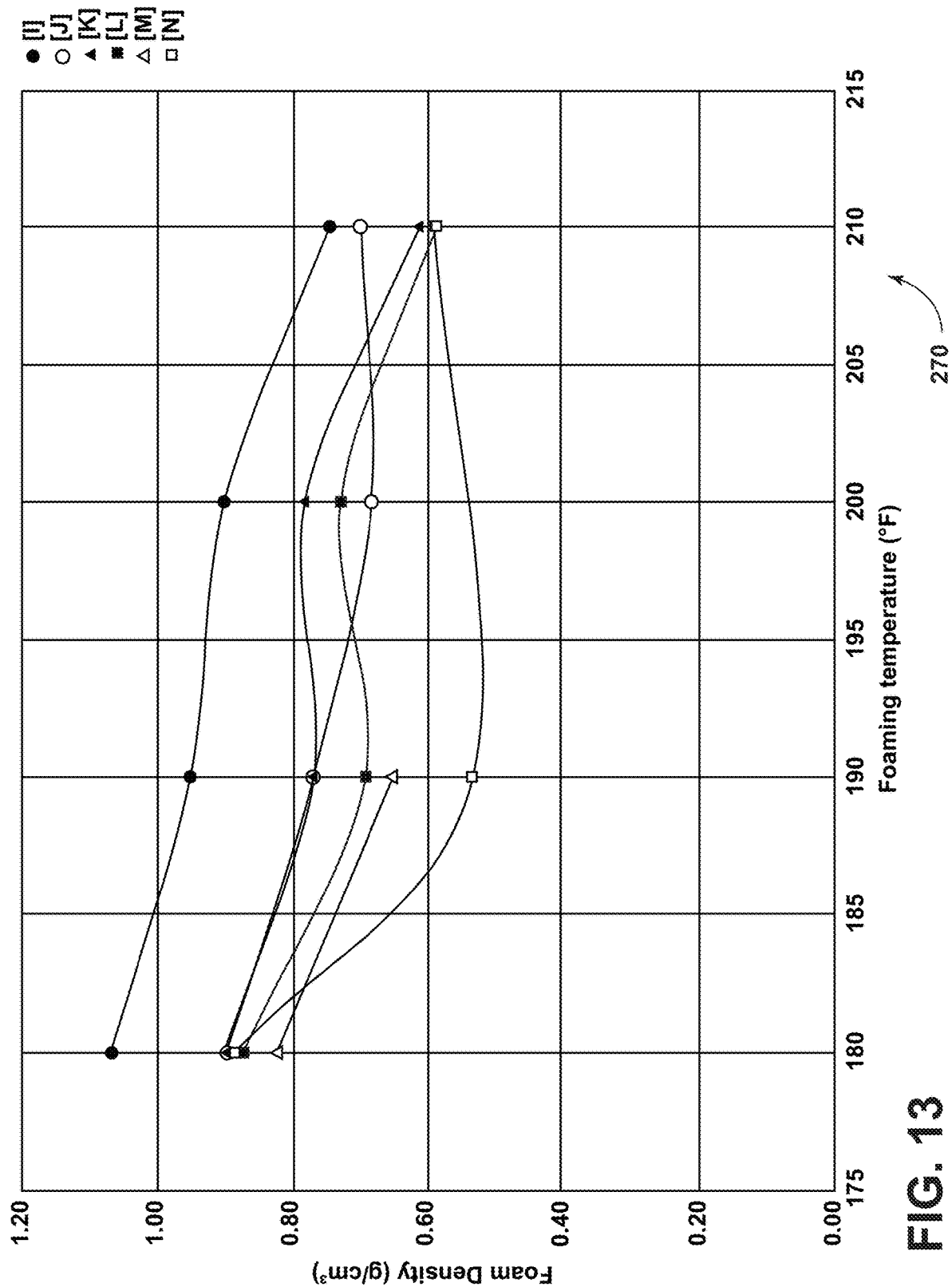
FIG. 13 illustrates a graph of density as a function of temperature according to aspects of the present disclosure.

FIG. 13 illustrates a graph 270 comparing the foam density of untreated samples [I] and pre-foam treated samples [J]-[N] at different foaming temperatures. The untreated PET sheets [I] and the pre-foam treated PET sheets [J]-[N] were heated to the indicated temperature in a floating air oven to initiate foaming of the sheets as a result of the expansion of the impregnated carbon dioxide gas. The graph 270 demonstrates that the pre-foam treated PET sheets [J]-[N] consistently have a lower density after solid state foaming compared to the untreated PET sheets [I]. The combination of the pre-foam treatment phase 102 with the impregnation and foaming phase 104 of the solid state foaming process 100 according to the present disclosure can produce microcellular foam sheets having a lower density than sheets formed using a conventional solid state foaming process that does not include a pre-foam treatment phase.

Example 7

Figure 14:
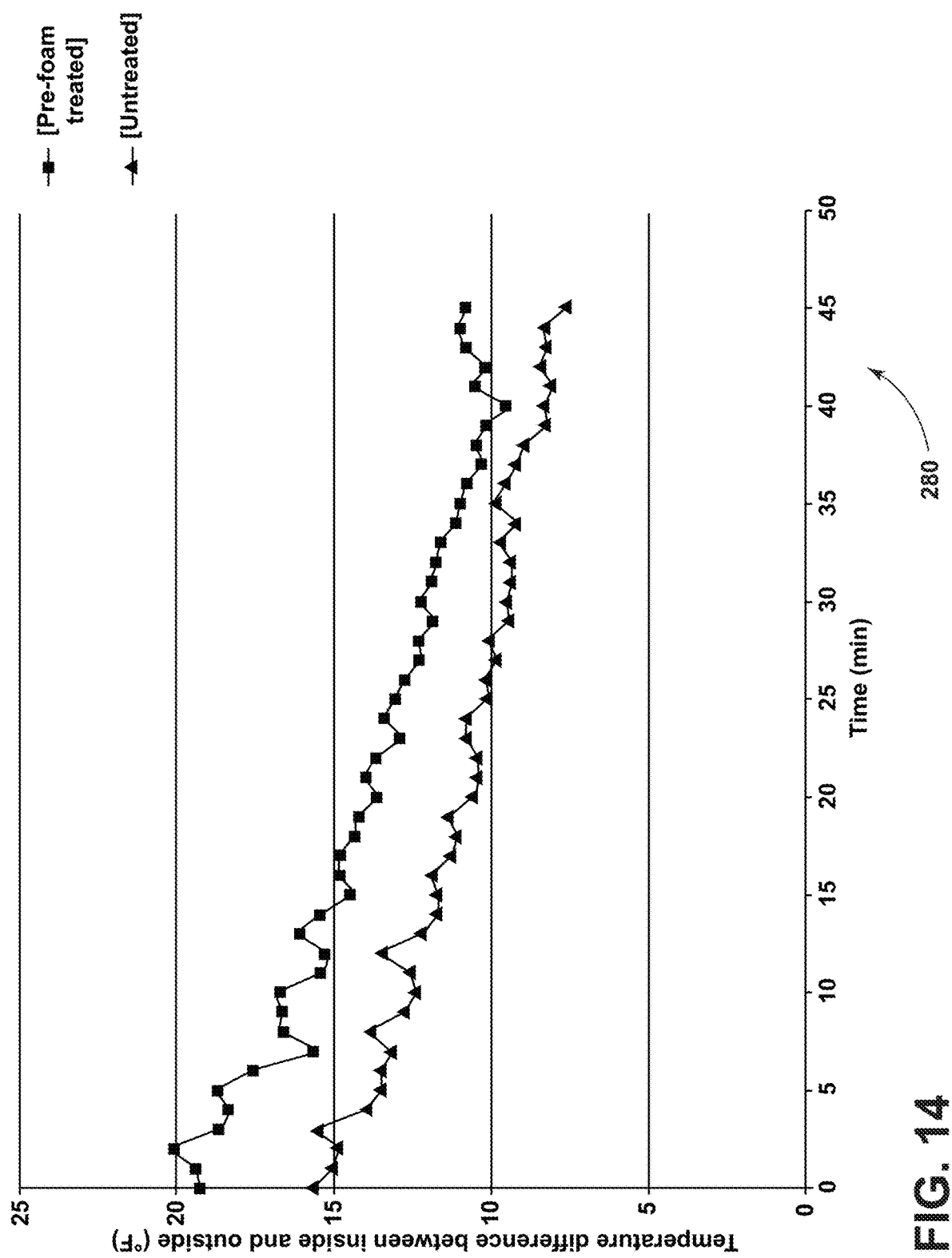
FIG. 14 illustrates a graph of the change in a temperature differential between opposite sides of a microcellular foam article as a function of time according to aspects of the present disclosure.
Figure 15:
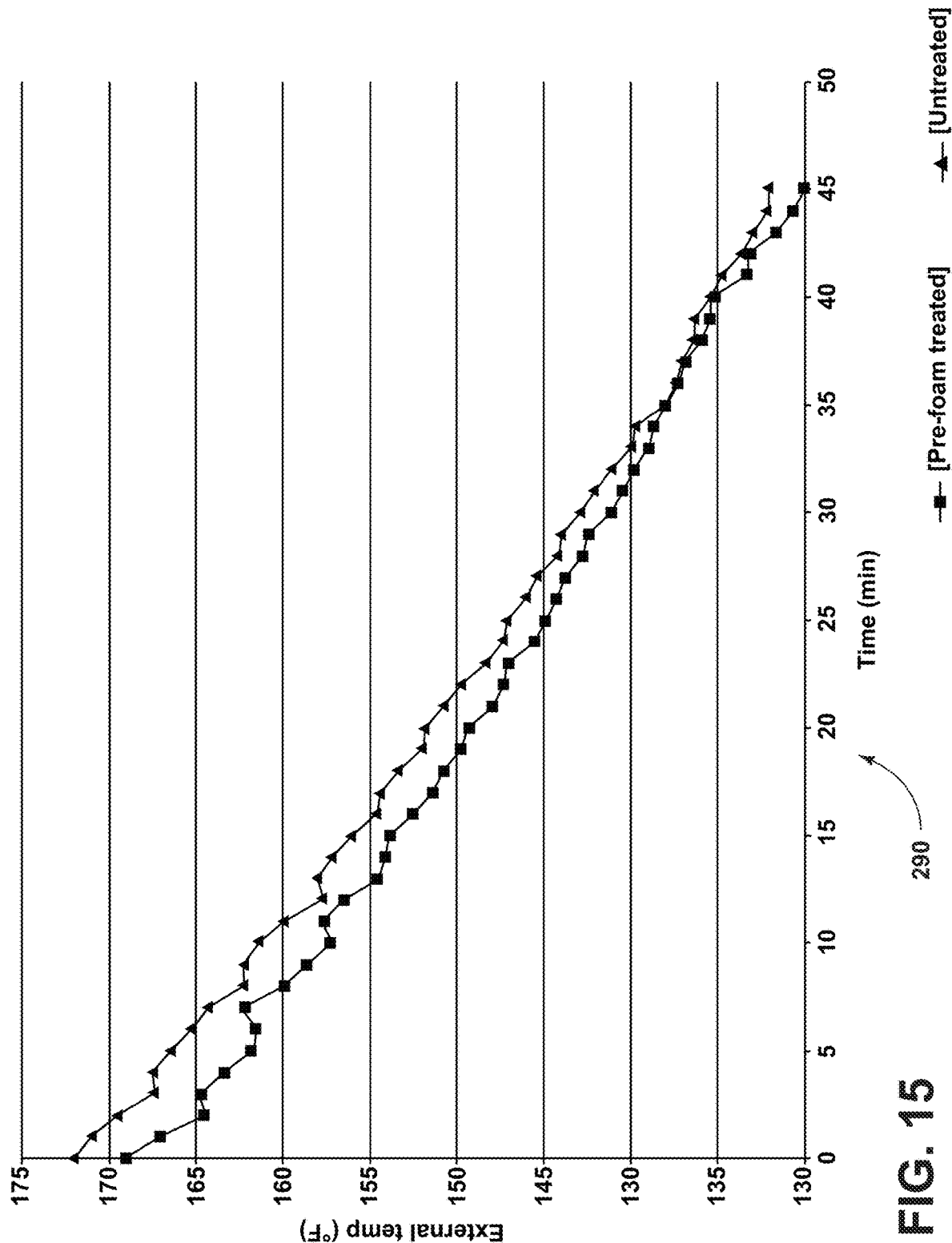
FIG. 15 illustrates a graph of the change in temperature on one side of a microcellular foam article as a function of time according to aspects of the present disclosure.

FIGS. 14 and 15 compare the insulative performance of a cup made using a microcellular PET sheet prepared according to the pre-foam treatment phase 102 of the present disclosure ("Pre-foam treated") and a microcellular PET sheet that did not include the pre-foam treatment ("Untreated"). The sheets used to form both the pre-foam treated cup and the untreated cup were foamed according to the same solid state foaming process, except that the pre-foam treated cup was made using a PET extrusion blend that included a chemical blow agent. Both the pre-foam treated and the untreated cups were formed into a cup using the same thermoforming process.

Both the untreated and the pre-foam treated cups were made using a monolayer PET sheet. The pre-foamed treated cup was made using a monolayer PET sheet that was made from a blend that includes PET and 1 wt. % SUKANO® fa S632 chemical blowing agent. Both sheets were foamed using a solid state foaming process that includes exposure to carbon dioxide gas at 660 psi for 15 hours followed by a 4 hour cap at 720 psi and a 4 hour desorption phase in a freezer. The freezer temperature is 23° F. (−5° C.), foaming sheet temperature is in the range of about 170-185° F. (about 77 to 85° C.), the thermoforming sheet temperature is in the range of about 200-210° F. (about 93 to 99° C.), and the hot mold temperature is in the range of about 375-390° F. (about 190 to 199° C.).

Graph 280 of FIG. 14 compares the temperature difference between the inside and the outside of each of the untreated and pre-foam treated cups when holding the same amount of a hot liquid at 190° F. The greater the difference in temperature between the inside and the outside of the cup, the cooler the cup will feel to the consumer's touch. Graph 290 of FIG. 15 shows that the external temperature of the pre-foam treated cup is lower than the untreated cup. The data in graphs 280 and 290 demonstrate that the pre-foam treated cup will feel cooler to a consumer's touch compared to the untreated cup and thus provides greater insulation from the hot contents of the cup to the consumer's hand compared to the untreated cup.

The data in FIGS. 14 and 15 demonstrate that in addition to differences in processing conditions during solid state foaming, such as an increase in the rate of carbon dioxide absorption or an increase in carbon dioxide retention, the pre-foam treatment according to the present disclosure can produce a microcellular foam article having insulative properties that are different than a corresponding untreated article.

Example 8

Table 3 below illustrates exemplary compositions for forming a microcellular foamed multi-layer sheet having an ABA construction that includes the pre-foam treatment phase 102 according to the present disclosure that is suitable for thermoforming into a cup.

TABLE 3

Example Multi-Layer Compositions

| Sample | Core "B" Layer | Outer "A" Layers |
|---|---|---|
| Example 1 | 39.5 wt. % virgin PET + 60 wt. % regrind PET + 0.5 wt. % SUKANO ® fa S632 | Virgin PET |
| Example 2 | 39.75 wt. % virgin PET + 60 wt. % regrind PET + 0.25 wt. % SAFOAM ® CE-335 | Virgin PET |

Nucleating Agent

According to another aspect of the present disclosure, the extrusion blend used to form the microcellular foam layer can include a nucleating agent instead of, or in combination with, the blowing agent in the pre-foam treatment phase 102. The extrusion blend can include a nucleating agent which can facilitate absorption of the non-reacting gas during the impregnation phase 136 of the impregnation and foaming phase 104 and/or cell nucleation and thus provide a microcellular foam having a desired density in less time compared to an untreated sample.

Figure 16:
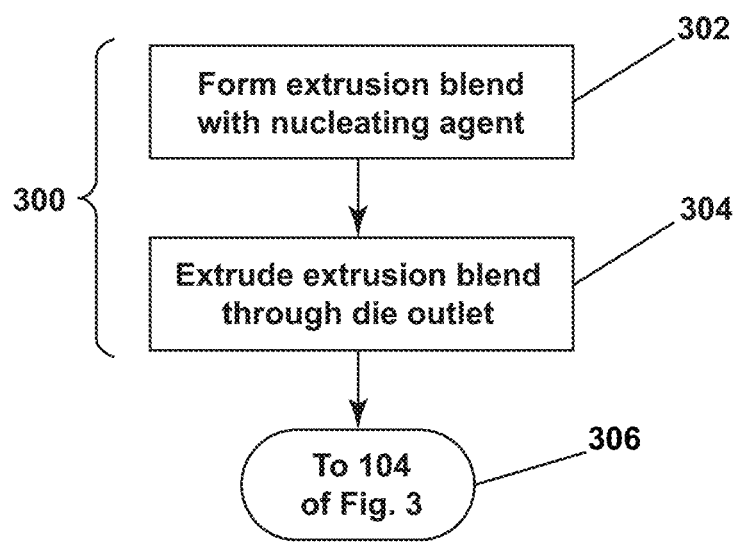
FIG. 16 is a flow chart illustrating a process for forming a multi-layer sheet according to aspects of the present disclosure.

FIG. 16 illustrates a flow chart for a pre-foam nucleator treatment phase 300 that includes the addition of a nucleating agent to provide an extrudate that can be used in the impregnation and foaming phase 104 of FIG. 3 to form a microcellular foam which can optionally be used in the forming/thermoforming phase 106 of the process 100. The pre-foam nucleator treatment phase 300 can be used to form the microcellular foam sheet 20 of FIGS. 1 and 2, with or without an outer sheet layer 24, 26.

According to one aspect, the extrudate formed in the pre-foam nucleator treatment phase 300 is foamed according to the impregnation and foaming phase 104 of the solid state foaming process 100. According to another aspect, the first extrusion blend formed at 122 of the pre-foam treatment phase 102 of FIG. 3 includes a nucleating agent in addition to the blowing agent. The pre-foam treatment phase 102, the impregnation and foaming phase 104, and optionally the forming/thermoforming phase 106 can proceed in a manner similar to that described above in the presence of the nucleating agent, with or without the blowing agent of the pre-foam treatment phase 102. Thus, the pre-foam nucleator treatment phase 300 can be used in the solid state foaming process 100 of FIG. 3 in combination with the pre-foam treatment phase 102 or in place of the pre-foam treatment phase 102.

The addition of the nucleating agent to the extrusion blend that forms the microcellular foam layer can facilitate the formation of a microcellular foam by solid state foaming compared to samples made without the addition of the nucleating agent. The presence of the nucleating agent can facilitate cell formation, including characteristics of the cells such as size, density, and/or uniformity. The nucleating agent can thus also affect the quality of the generated microfoam, including the density and/or the thickness of the microfoam. While not limiting in scope, it is theorized that the nucleating agent may facilitate cold crystallization during thermoforming of the microcellular foam sheet, which can reduce cycle time. The nucleating agent may have little to no effect on melt crystallization such that the extruded sheet remains in an amorphous state prior to the gas impregnation phase of the solid state foaming process.

Still referring to FIG. 16, at 302 a first polymeric material is combined with a nucleating agent and optional additives to form a first extrusion blend that will form the foam core layer 22. Optionally, a second polymeric material is combined with additives to form a second extrusion blend that will form one or more outer sheet layers 24, 26 in a manner similar to that described above with respect to the pre-foam treatment phase 102 of FIG. 4, however, the first and second extrusion blends according to the pre-foam nucleator treatment phase 300 may or may not include a blowing agent. The first and second extrusion blends can include a single polymer or a blend of two or more polymers, examples of which include polyethylene terephthalate (PET) including recycled PET, plant based PET, modified PET copolymer, amorphous or crystalline PET, glycol-modified (PETG), and other polyesters, as well as polyether ether ketone (PEEK), polyethylene naphthalate (PEN), polybutylene terephthalate (PBT), polymethyl methacrylate (PMMA), polyhydroxy alkanoates (PHA), polylactic acid (PLA), thermoplastic urethane (TPU), polycarbonate (PC), polystyrene (PS), polypropylene (PP), or polyethylene (PE). The polymer(s) forming the first and second polymeric materials may be the same or different. Optionally, a portion of the polymer(s) in the first and/or second extrusion blend can include a regrind material.

The nucleating agent combined with the first polymeric material at 302 can be an inorganic or organic nucleating agent. Examples of suitable nucleating agents include talc, sodium benzoate, and polytetrafluoroethylene (PTFE). According to one aspect, the amount of nucleating agent present in the first extrusion blend is in the range of about 0.125 to about 1.25 wt. %. In one aspect, the nucleating agent is provided as a masterbatch that includes the nucleating agent combined with a carrier and the amount of nucleating agent masterbatch combined with the first extrusion blend can be in the range of about 0.5 to 5 wt. %. The amount of nucleating agent used may be based on the type of nucleating agent (e.g. inorganic or organic nucleating) or characteristics of the nucleating agent, such as particle size.

The first extrusion blend is heated to form a plasticated mixture or melt that is moved through a melting extruder to a heated die. A co-extruder can be joined with the heated die to provide the second extrusion blend as a melt to the heated die for co-extrusion with the first extrusion blend melt. At 304, the first and optional second extrusion blend melts are extruded through the heated die to form a multi-layer extrudate including a first layer formed from the first extrusion blend and a second layer formed from the second extrusion blend. The heated die can be a flat die that produces an extrudate sheet. At 306, the multi-layer extrudate formed at 304 can be treated according to the impregnation and foaming phase 104 of FIG. 5 of the solid state foaming process 100 of FIG. 3 to produce a microcellular foam.

EXAMPLES

FIGS. 17-20 illustrate the effect of addition of the nucleating agent to the first extrusion blend according to the pre-foam nucleator treatment phase 300 on the impregnation and foaming phase 104 used to generate a microcellular foam sheet according to the present disclosure.

Example 9

Figure 17:
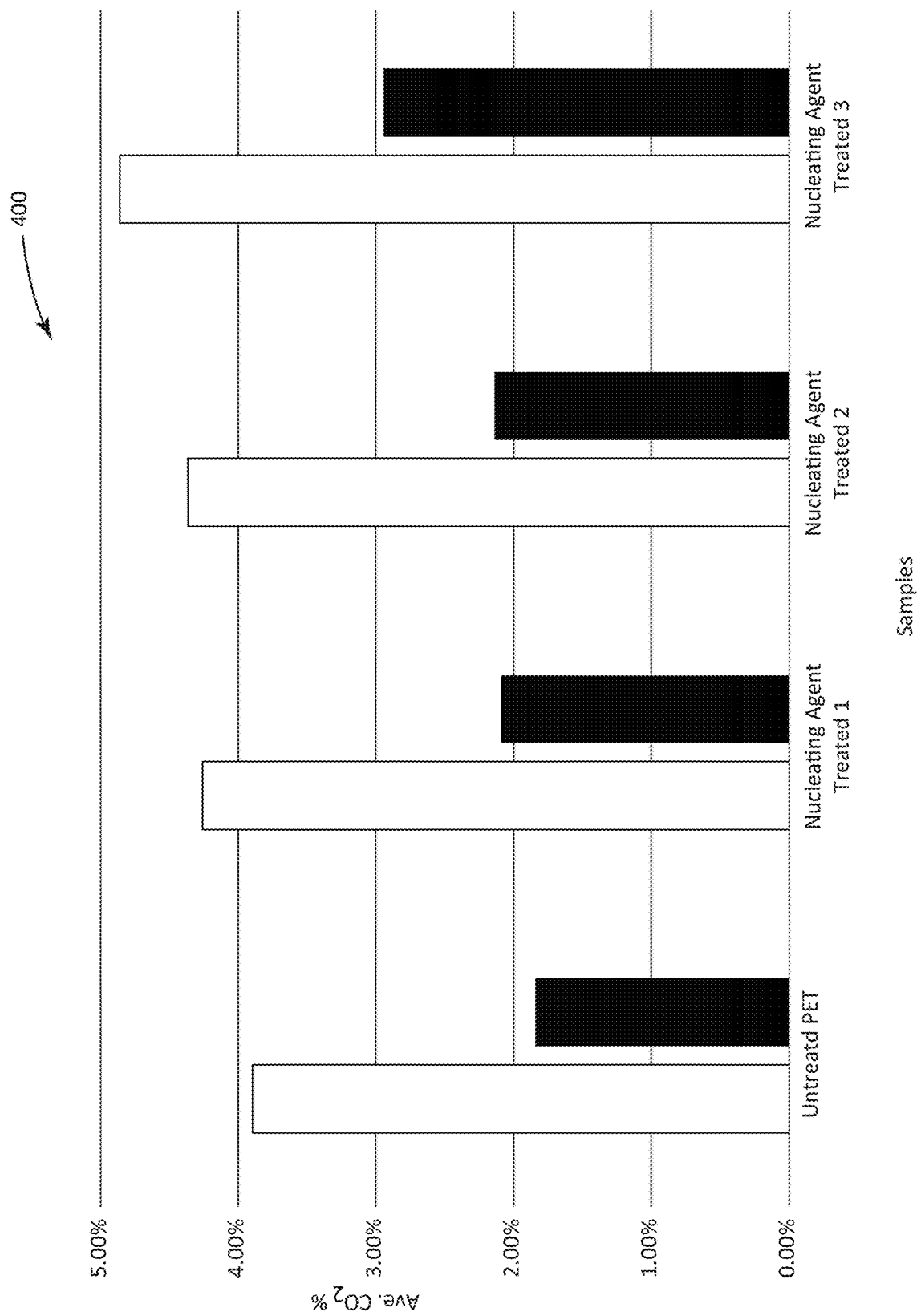
FIG. 17 illustrates a graph comparing gas absorption of microcellular foam sheets according to aspects of the present disclosure and conventional microcellular foam sheets.

FIG. 17 illustrates a graph 400 demonstrating the effect of the presence of an inorganic nucleating agent, talc, in the first extrusion blend on the amount of carbon dioxide absorbed by an extruded PET sheet during the gas impregnation phase of the impregnation and foaming phase 104. The amount of carbon dioxide absorbed by the PET sheets formed with and without a nucleating agent was determined for two different gas impregnation conditions: (a) exposure to carbon dioxide at 660 psi for 36 hours followed by a 4 hour cap at 720 psi (white bars) and (b) exposure to carbon dioxide at 660 psi for 20 hours followed by a 4 hour cap at 720 psi (black bars).

The graph of FIG. 17 compares the amount of carbon dioxide absorbed at both gas impregnation conditions for a PET sheet without a nucleating agent ("Untreated PET"), a PET sheet including 2 wt. % TA10-13 MB01 talc nucleating agent ("Nucleating Agent Treated 1"), a PET sheet including 4 wt. % TA10-13 MB01 talc nucleating agent ("Nucleating Agent Treated 2"), and a PET sheet including 4 wt. % T na S595 talc nucleating agent ("Nucleating Agent Treated 3"). TA10-13 and T na S595 are both PET nucleating agent masterbatches that include talc and a carrier, both of which are commercially available from SUKANO®. According to the manufacturer, TA10-13 contains about 28 wt. % talc and T na S595 contains about 26 wt. % talc. As illustrated in FIG. 17, all of the Nucleating Agent Treated samples 1-3 absorbed a greater amount of carbon dioxide than the Untreated PET sample under the same gas impregnation conditions.

Example 10

Figure 18:
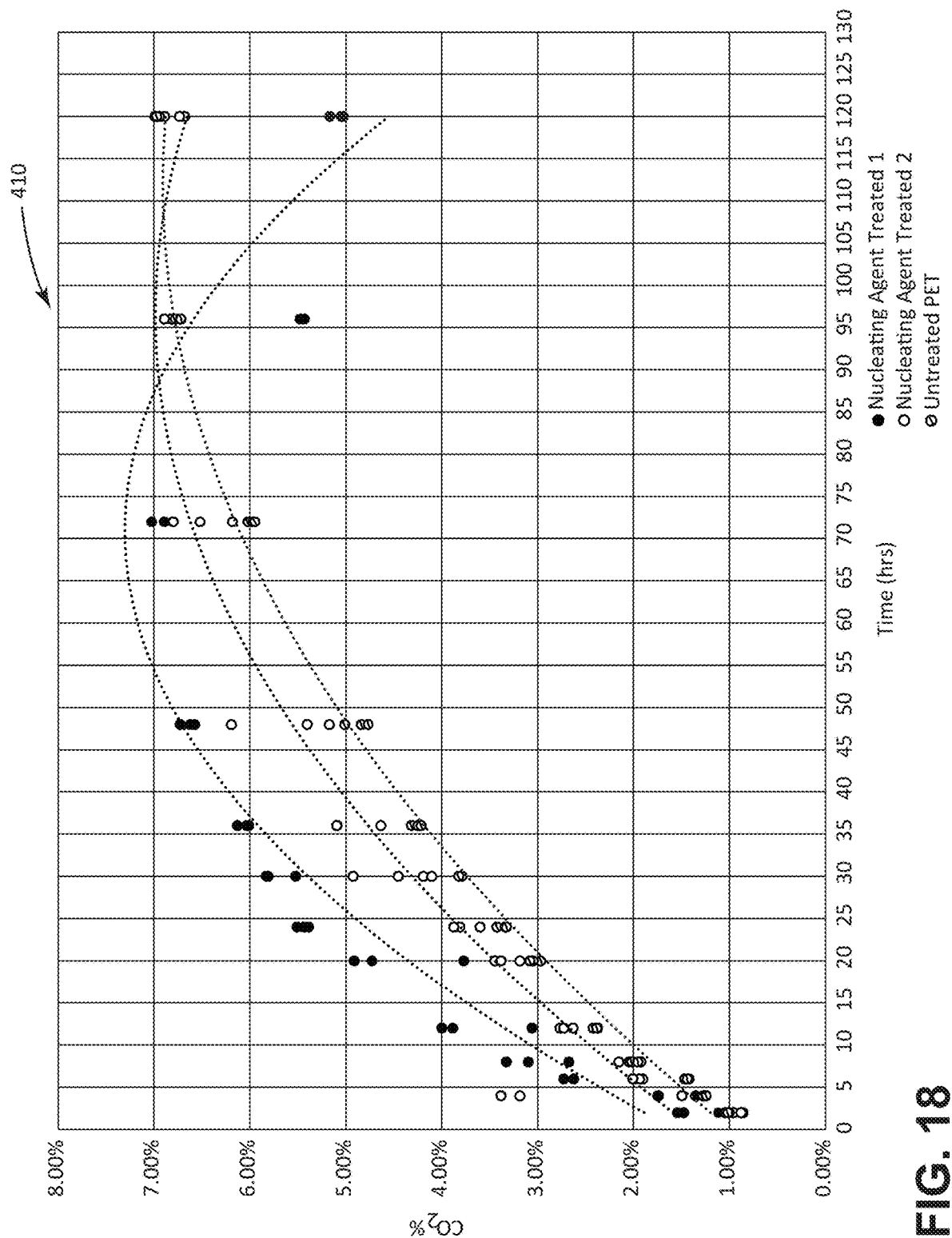
FIG. 18 illustrates a graph of density as a function of temperature for microcellular foam sheets according to aspects of the present disclosure.

FIG. 18 illustrates a graph 410 demonstrating the differences in carbon dioxide absorption during the gas impregnation phase at different exposure times for a PET sheet without a nucleating agent ("Untreated PET"), a PET sheet including 2 wt. % TA10-13 MB01 talc nucleating agent ("Nucleating Agent Treated 1"), and a PET sheet including 4 wt. % TA10-13 MB01 talc nucleating agent ("Nucleating Agent Treated 2"). Each of the untreated and nucleating agent treated sheets were PET sheets having a thickness of 0.040 inches (~1.0 mm) and exposed to carbon dioxide at 660 psi for the times indicated.

As demonstrated in FIG. 18, the Nucleating Agent Treated samples 1 and 2 both exhibited an increase carbon dioxide absorption compared to the Untreated PET sample over a wide range of exposure times. The data in FIG. 18 indicate an improvement in the amount of carbon dioxide absorbed at a given time, particularly in the range of about 5 to 72 hours of exposure, when the PET extrudate includes a nucleating agent. Thus, the inclusion of a nucleating agent in the PET sheet according to the present disclosure can decrease the amount of time required during the gas impregnation phase of the solid state foaming process compared to an untreated sample.

Example 11

Figure 19:
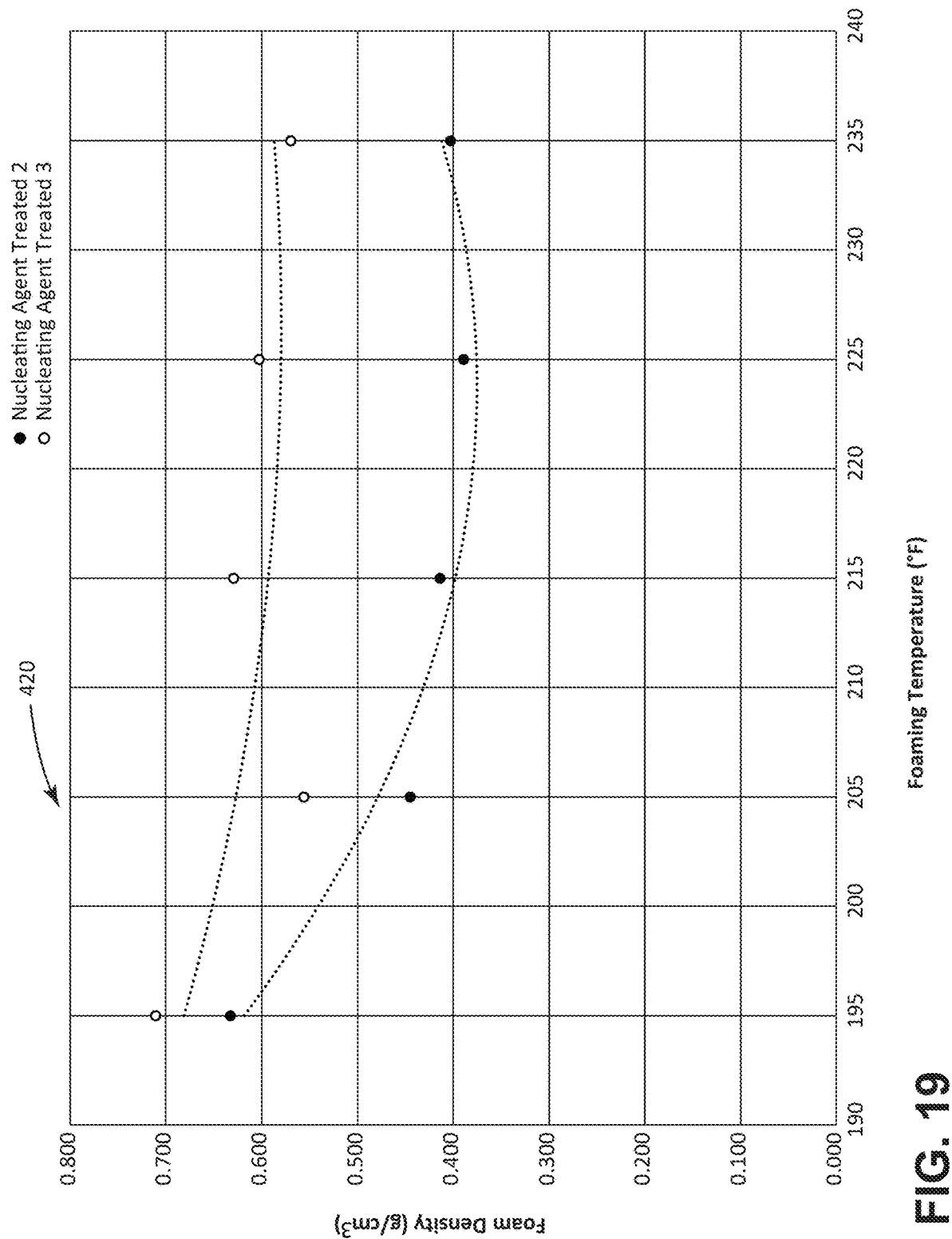
FIG. 19 illustrates a graph of thickness as a function of temperature for microcellular foam sheets according to aspects of the present disclosure.
Figure 20:
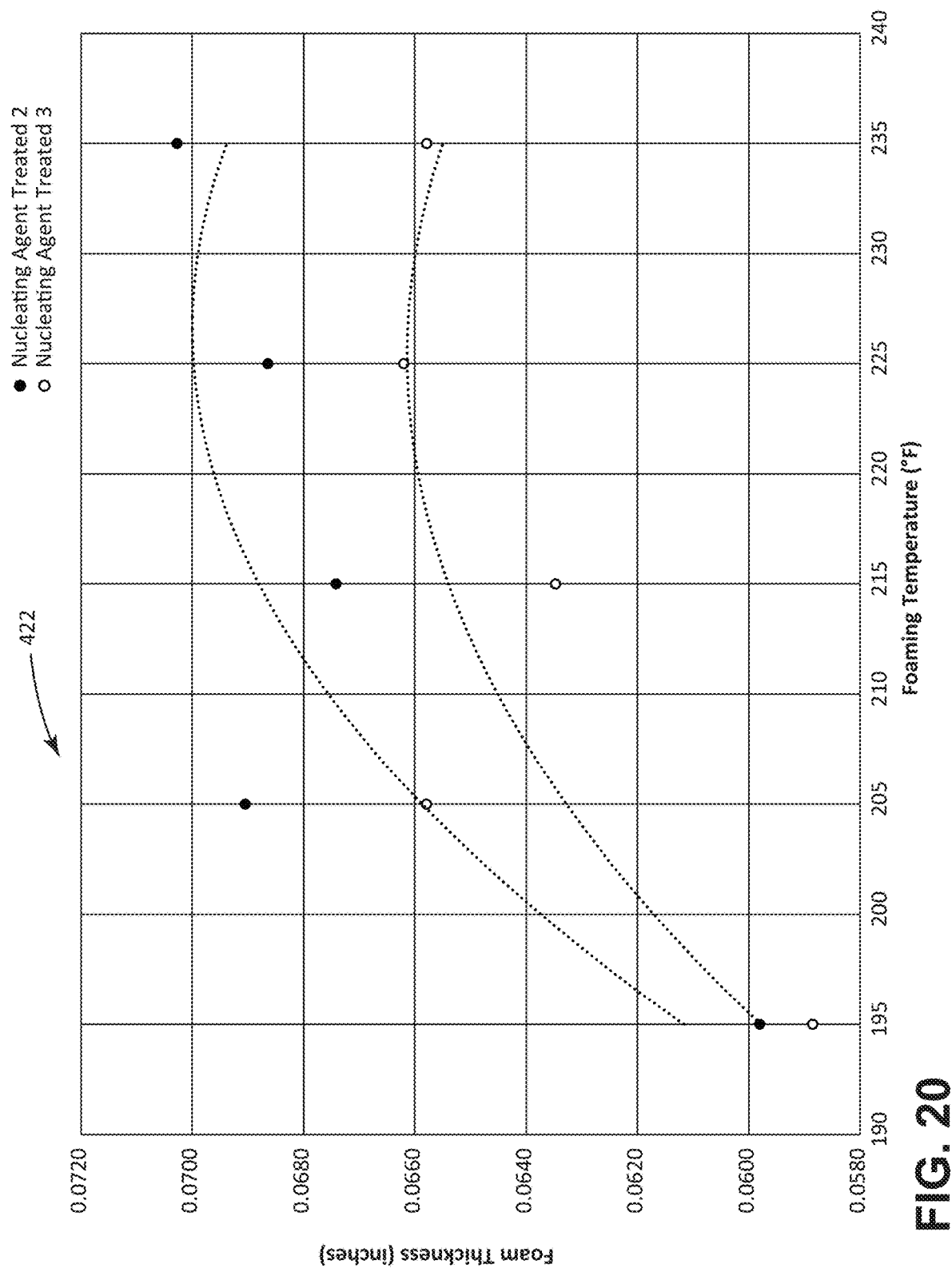
FIG. 20 illustrates a graph comparing gas absorption as a function of time for microcellular foam sheets according to aspects of the present disclosure and conventional microcellular foam sheets.

FIGS. 19 and 20 compare the density and thickness of solid state foamed sheets made according to the present disclosure using two different types of nucleating agents in the pre-foam nucleator treatment phase 300. FIG. 19 illustrates a graph 420 of foam density as a function of foaming temperature for a solid state foamed sheet of PET according to the present disclosure in which the PET extrusion blend was mixed with a nucleating agent. PET sheets were made including either 4 wt. % TA10-13 MB01 talc nucleating agent ("Nucleating Agent Treated 2") or 4 wt. % T na S595 talc nucleating agent ("Nucleating Agent Treated 3"). The sheets had a thickness of 0.040 inches (~1.0 mm) prior to foaming and were exposed to carbon dioxide during the gas impregnation phase for 15 hours at 700 psi, followed by a 9 hour cap at 780 psi. FIG. 20 illustrates a graph 422 that compares the thickness of the foamed sheets prepared as described for FIG. 19 at different foaming temperatures.

As illustrated in FIGS. 19 and 20, the Nucleating Agent Treated 2 sheets made using 4 wt. % TA10-13 MB01 generally exhibit a lower foam density and a thicker foam sheet at a given foaming temperature compared to the Nucleating Agent Treated 3 sheets which used a different type of talc nucleating agent. Thus, according to an aspect of the present disclosure, a microcellular foam sheet treated according to the pre-foam nucleator treatment phase 300 can have a density less than 1 g/cm$^3$, and specifically less than 0.8 g/cm$^3$, as shown in the embodiment of Example 11.

Pre-Foam Treatment with Blowing Agent & Nucleating Agent

According to another aspect of the present disclosure, the microcellular foam sheet can be formed using a process that combines the pre-foam treatment phase 102 of FIG. 3 and the use of a nucleating agent according to the pre-foam nucleator treatment phase 300 of FIG. 16. The nucleating agent can be added to the first extrusion blend at 122 of the pre-foam treatment phase 102 of FIG. 4, in addition to the blowing agent, to form a first extrusion blend that includes both a nucleating agent and a blowing agent. The impregnation and foaming phase 104 of the solid state foaming process 100 of FIG. 3 can proceed with the extrusion blend that includes both a nucleating agent and blowing agent in a manner similar to that described above with respect to the manner in which the process proceeds when the pre-foam treatment phase 102 is used alone without the pre-foam nucleator treatment phase 300. The nucleating agent is added to the first extrusion blend at 122 in a manner similar to that described above with respect to the pre-foam nucleator treatment phase 300 of FIG. 16.

According to one aspect, the use of the blowing agent in the pre-foam treatment phase 102 can facilitate the absorption of the non-reacting gas during solid state foaming to decrease the amount of time required to achieve a given concentration of absorbed gas, as described above. The presence of the nucleating agent can facilitate cell formation, which may include characteristics of the cells such as size, density, and uniformity, which can affect the quality of the generated microfoam, including the density and/or the thickness of the foam. The combination of the nucleating agent and the blowing agent in the extrusion blend that forms the microcellular foam layer can facilitate the solid state foaming process and the forming process by facilitating gas absorption and cell formation. The combination of the nucleating agent and blowing agent may generate microcellular foam sheets and articles having the desired density and thickness at faster cycle times compared to processes which do not utilize a blowing agent and nucleating agent in the foam extrusion blend.

EXAMPLES

Examples 12-13 and FIGS. 21-24 illustrate the effect of the addition of a nucleating agent and a blowing agent to the first extrusion blend for use in the impregnation and foaming phase 104 to generate a microcellular foam sheet according to the present disclosure.

Example 12

Figure 21:
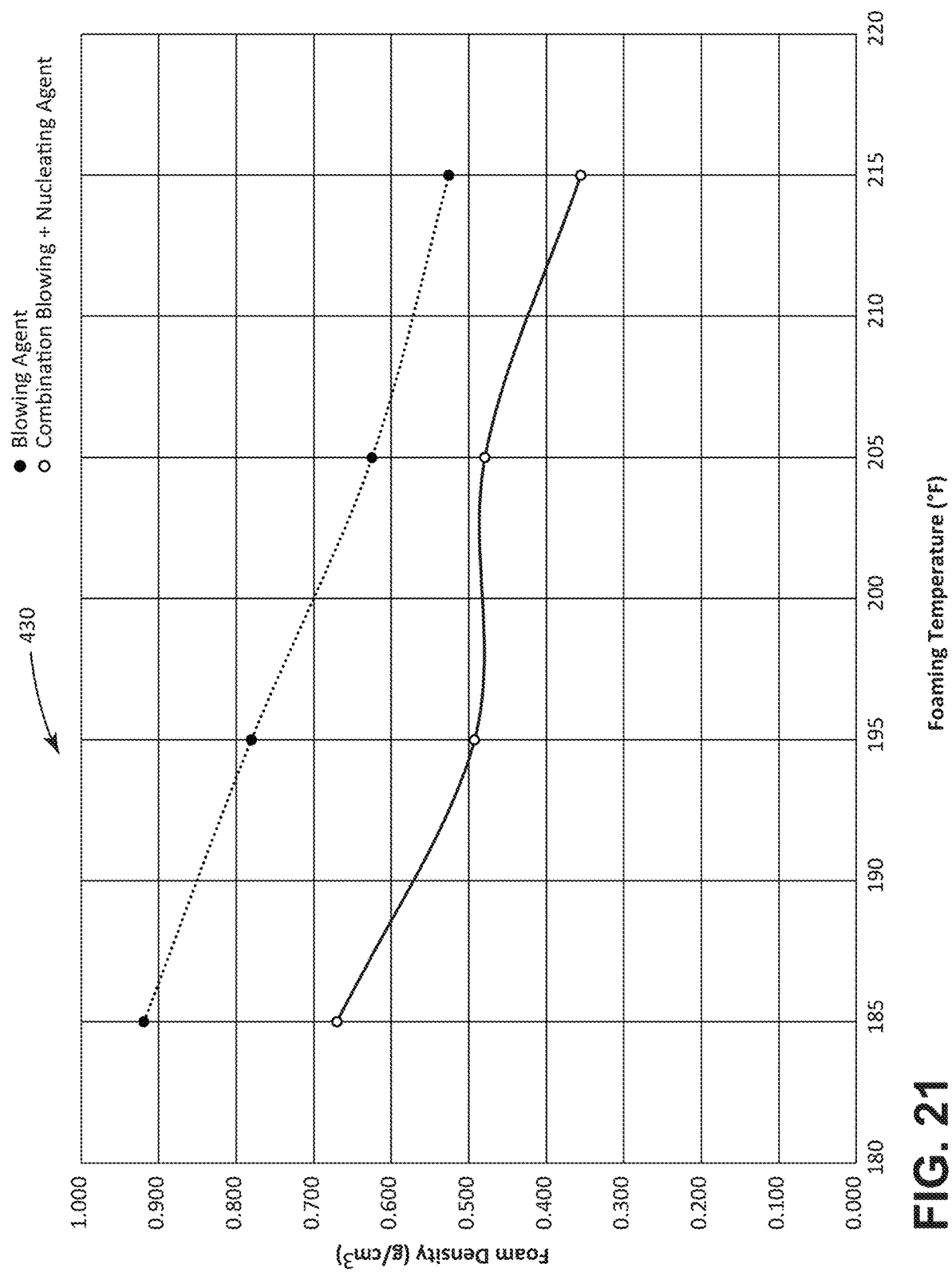
FIG. 21 illustrates a graph comparing foam density as a function of foaming temperature according to aspects of the present disclosure.
Figure 22:
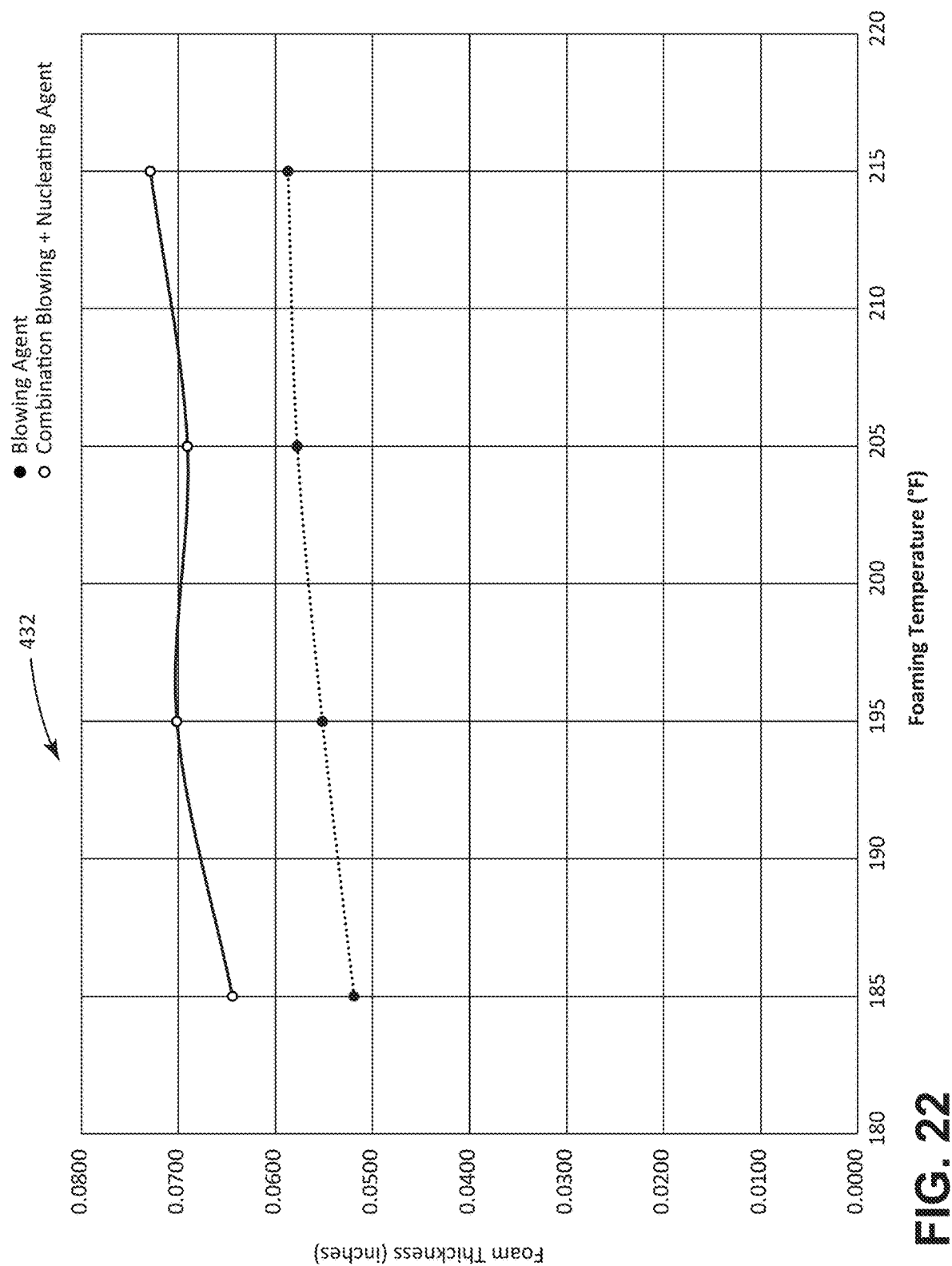
FIG. 22 illustrates a graph comparing foam thickness as a function of foaming temperature according to aspects of the present disclosure.

FIGS. 21 and 22 compare the density and thickness, respectively, of solid foam sheets made according to the present disclosure using a combination of a nucleating agent and blowing agent with solid foam sheets made using only a blowing agent. The sheets were made using the same process parameters using PET except that the extrusion blend for the "Blowing Agent" samples included a blowing agent whereas the "Combination Blowing+Nucleating Agent" samples included both a blowing agent and a nucleating agent. The blowing agent for both sample sets was SAFOAM® CE-335, which is commercially available from REEDY Chemical Foam & Specialty Additives, U.S.A. and described by the producer as containing sodium citrate and calcium carbonate in a polyethylene carrier. The blowing agent loading was about 0.25 to 1 wt. %. The nucleating agent for the Combination Blowing+Nucleating Agent samples was Sukano® T na S595, a talc-based nucleating agent, at a loading of about 2 wt. %. The solid state foaming conditions included 21 hours at 700 psi during the gas impregnation phase, followed by a 7 hour cap at 780 psi.

FIG. 21 illustrates a graph 430 comparing the density of a microcellular PET foam as a function of foaming temperature for the Blowing Agent samples formed from the PET extrusion blend that includes a blowing agent compared to the Combination Blowing+Nucleating Agent samples formed from the PET extrusion blend that includes both a blowing agent and a nucleating agent. As demonstrated by graph 430, at each of the observed foaming temperatures, the Combination Blowing+Nucleating Agent samples produced a microcellular foam sheet having a lower density than sheets formed using just a blowing agent. Graph 432 illustrated in FIG. 22 shows that the Combination Blowing+Nucleating Agent samples also produced a foam having a greater thickness at the observed foaming temperatures compared to when only a blowing agent was added. The ability to produce a thicker foam at a given density can be an advantage in forming certain types of articles from the foam sheet, such as large or deep-draw containers (e.g., 20 ounce cups).

Example 13

Figure 23:
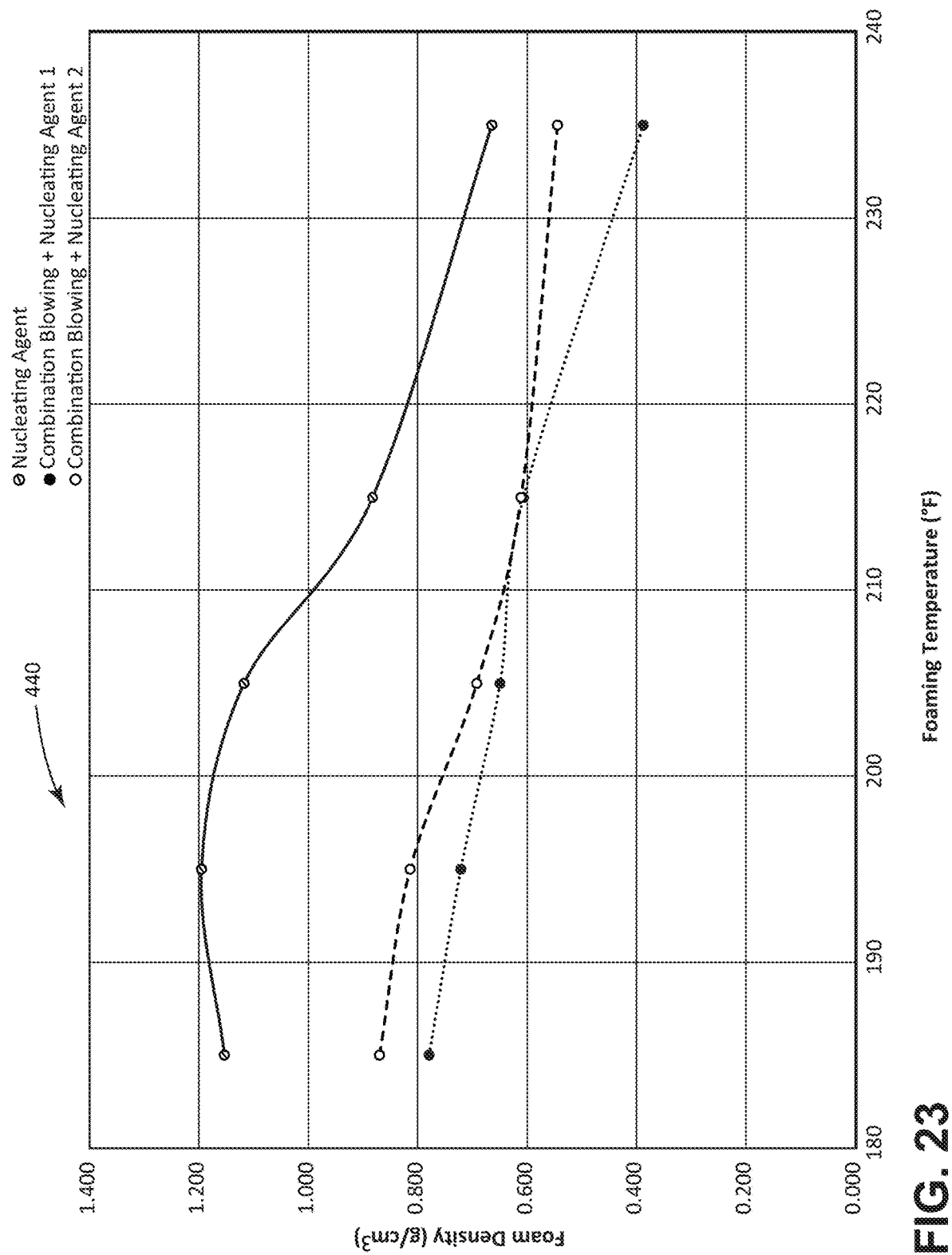
FIG. 23 illustrates a graph comparing foam density as a function of foaming temperature according to aspects of the present disclosure.
Figure 24:
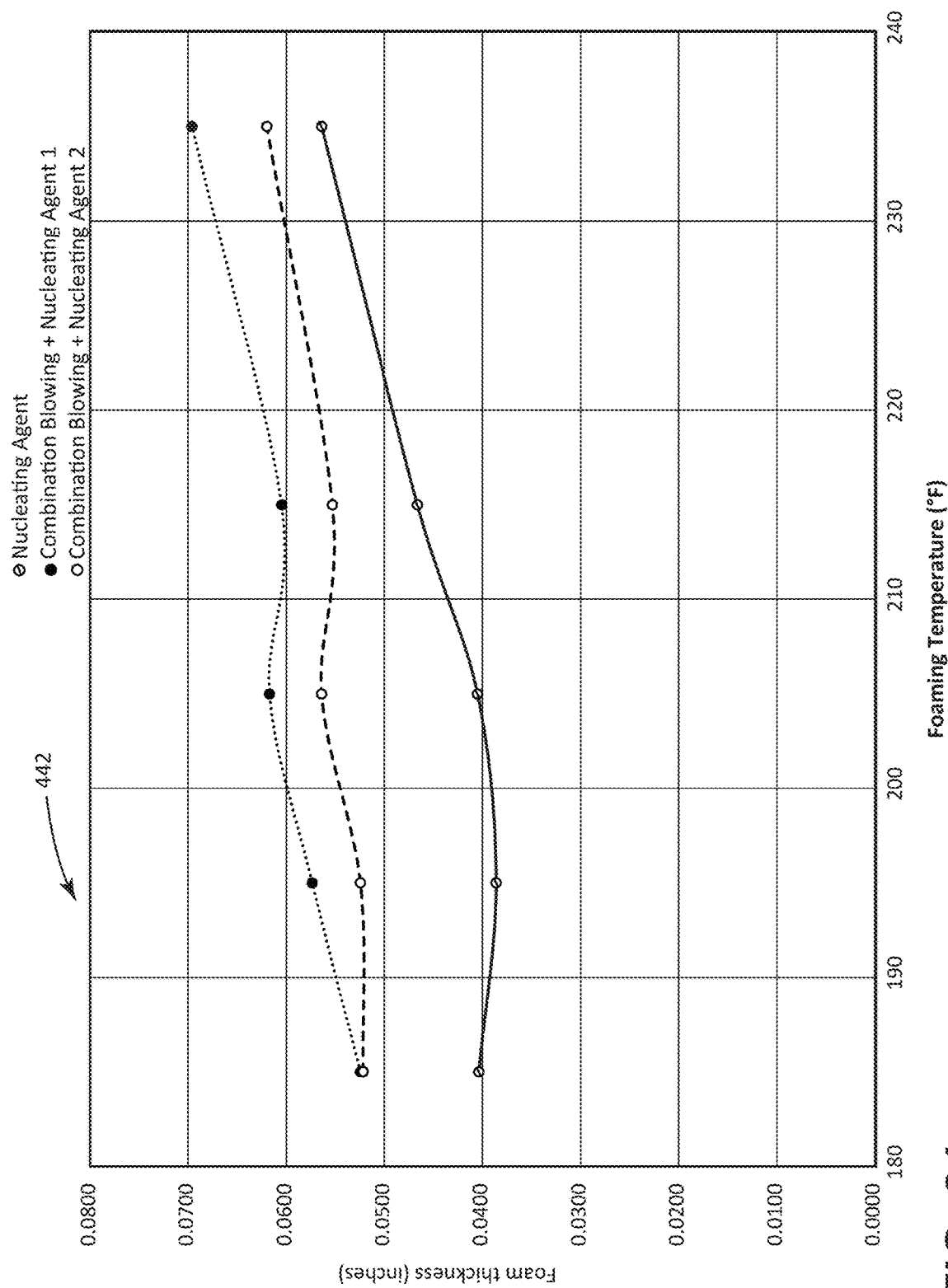
FIG. 24 illustrates a graph comparing foam thickness as a function of foaming temperature according to aspects of the present disclosure.

FIGS. 23 and 24 compare the density and thickness, respectively, of solid state foam sheets made according to the present disclosure using a combination of a nucleating agent and blowing agent with solid foam sheets made using only a blowing agent. The data in FIGS. 23 and 24 illustrate the effects of an organic nucleating agent, PTFE, on the solid state foamed sheets. The sheets were made using the same process parameters using PET except that the extrusion blend for the "Nucleating Agent" samples included a nucleating agent without a blowing agent whereas the "Combination Blowing+Nucleating Agent" samples included both a blowing agent and a nucleating agent. The blowing agent for the Combination Blowing+Nucleating Agent 1 samples was SAFOAM® CE-335, which is commercially available from REEDY Chemical Foam & Specialty Additives, U.S.A. and described by the producer as containing sodium citrate and calcium carbonate in a polyethylene carrier, at a loading of about 1 wt. %. The blowing agent for the Combination Blowing+Nucleating Agent 2 samples was SUKANO® fa S632 commercially available from Sukano Polymers Corporation, U.S.A. and described by the producer as a foaming agent masterbatch in a solid polymer matrix, at a loading of about 0.75 wt. %. The nucleating agent for all of the samples was a PTFE nucleating agent, commercially available as XD-8461 from Shamrock Technologies, U.S.A., at a loading of about 0.5 wt. %. The solid state foaming conditions included a gas impregnation phase at 700 psi for 15 hours, followed by a 9 hour cap at 780 psi.

FIG. 23 illustrates a graph 440 comparing the density of a microcellular PET foam as a function of foaming temperature for the Nucleating Agent samples formed from the PET extrusion blend that includes an organic nucleating agent without a blowing agent compared to the Combination Blowing+Nucleating Agent 1 and 2 samples formed from the PET extrusion blend that include both a blowing agent and the PTFE nucleating agent. As demonstrated by graph 440, at each of the observed foaming temperatures, the Combination Blowing+Nucleating Agent 1 and 2 samples produced a microcellular foam sheet having a lower density than sheets formed using just the PTFE nucleating agent. Graph 442 illustrated in FIG. 24 shows that the Combination Blowing+Nucleating Agent 1 and 2 samples also produced a foam having a greater thickness at the observed foaming temperatures compared to when only the PTFE nucleating agent was added.

Additional Pre-Foam Treatment Phase Examples

Example 14

Figure 25:
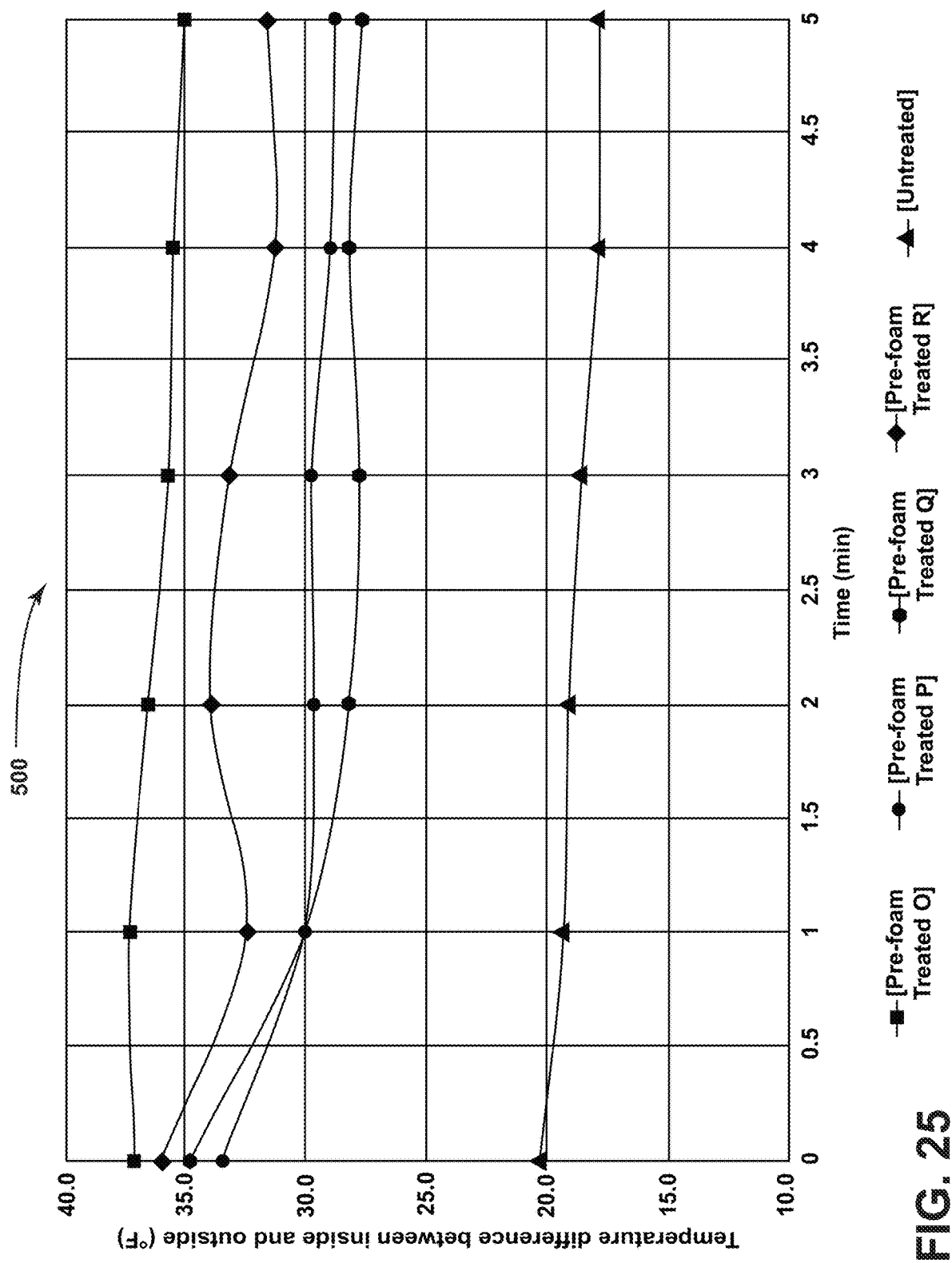
FIG. 25 illustrates a graph of the change in a temperature differential between opposite sides of a microcellular foam article as a function of time according to aspects of the present disclosure.
Figure 26:
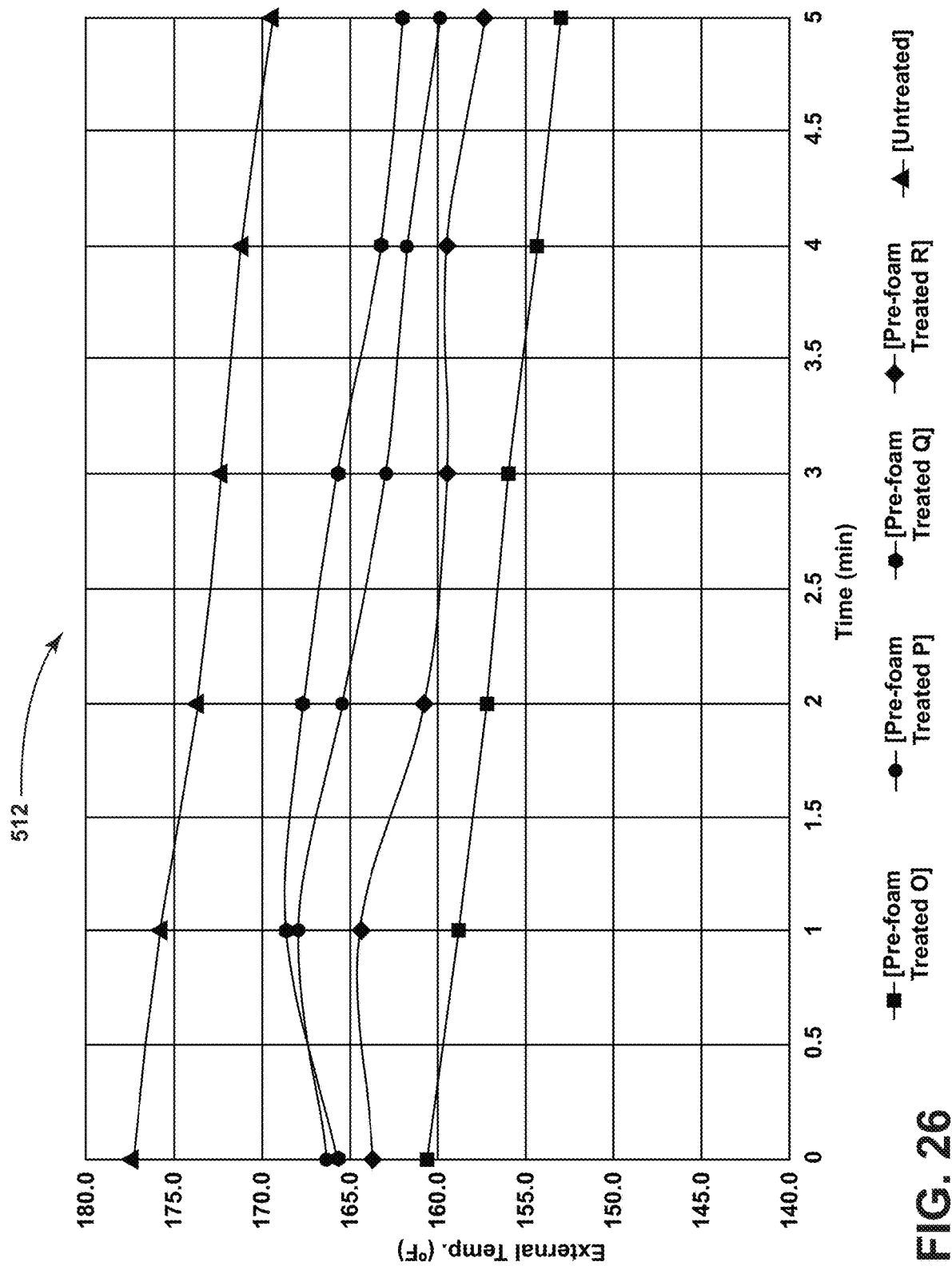
FIG. 26 illustrates a graph of the change in an external temperature of a microcellular foam article as a function of time according to aspects of the present disclosure.

FIGS. 25 and 26 compare the insulative performance of cups made using a microcellular PET sheet prepared according to the pre-foam treatment phase 102 of the solid state foaming process 100 of the present disclosure ("Pre-foam treated") and a microcellular PET sheet that did not include the pre-foam treatment phase 102 ("Untreated"). The sheets used to form both the pre-foam treated cups and the untreated cup were foamed according to the same solid state foaming process 100, with and without the pre-foam treatment phase 102, respectively. Both the pre-foam treated and the untreated cups were formed into a cup using the same thermoforming process. The pre-foam treated and untreated cups were formed from a single foam layer sheet.

Both the untreated and the pre-foam treated cups were made using a monolayer PET sheet. The pre-foamed treated cups were made using a monolayer PET sheet that was made from a blend that includes PET and a blowing agent at 4 different concentrations: 0.4 wt. % ("Pre-foam treated O"), 0.5 wt. % ("Pre-foam treated P"), 0.75 wt. % ("Pre-foam treated Q"), 1 wt. % ("Pre-foam treated R"). The blowing agent for all 4 pre-foam treated cups was SAFOAM® CE-335. All of the sheets were foamed using a solid state foaming process that includes exposure to carbon dioxide gas at 660 psi for 36 hours followed by a 4 hour cap at 765 psi and a 4 hour desorption phase in a freezer. The freezer temperature is 23° F. (−5° C.), foaming sheet temperature is in the range of about 155-170° F. (about 68-77° C.), the thermoforming sheet temperature is in the range of about 200-210° F. (about 93 to 99° C.), and the hot mold temperature is in the range of about 375-390° F. (about 190 to 199° C.).

Graph 500 of FIG. 25 compares the temperature difference between the inside and the outside of each of the untreated and pre-foam treated cups when holding the same amount of a hot liquid at 190° F. The greater the difference in temperature between the inside and the outside of the cup, the cooler the cup will feel to the consumer's touch. Graph 510 of FIG. 26 shows that the external temperature of the pre-foam treated cups is lower than the untreated cup. The data in graphs 500 and 510 demonstrate that the pre-foam treated cup will feel cooler to a consumer's touch compared to the untreated cup and thus provides greater insulation from the hot contents of the cup to the consumer's hand compared to the untreated cup. The data in graphs 500 and 510 also demonstrate that different concentrations of blowing agent in the pre-foam treated samples can affect the insulative properties of the material.

The data in FIGS. 25 and 26 demonstrate that in addition to differences in processing conditions during solid state foaming, such as an increase in the rate of carbon dioxide absorption or an increase in carbon dioxide retention, the pre-foam treatment phase 102 according to the present disclosure can produce a microcellular foam article having insulative properties that are different than a corresponding untreated article.

Example 15

Table 4 illustrates the effect of the pre-foam treatment phase 102 according to the present disclosure on the density of the foam sheet following the solid state foaming process. Table 4 lists the materials and the density for an untreated sample [S] and pre-foam treated samples [T] through [Y].

TABLE 4

Samples [S] through [Y]

| Sample | Pre-Foam Treatment | Density g/cm³ (lb/ft³) |
|---|---|---|
| Untreated sample [S] | No pre-foam treatment | 1.34 (83.4) |
| Pre-foam treated sample [T] | 0.2 wt. % blowing agent | 1.24 (77.7) |
| Pre-foam treated sample [U] | 0.3 wt. % blowing agent | 1.22 (76.0) |
| Pre-foam treated sample [V] | 0.4 wt. % blowing agent | 1.21 (75.3) |
| Pre-foam treated sample [W] | 0.5 wt. % blowing agent | 1.21 (75.4) |
| Pre-foam treated sample [X] | 0.75 wt. % blowing agent | 1.21 (75.3) |
| Pre-foam treated sample [Y] | 1.0 wt. % blowing agent | 1.09 (67.9) |

The untreated sample [S] and the pre-foam treated samples [T] through [Y] were foamed according to the same solid state foaming process 100, with and without the pre-foam treatment phase 102, respectively. The pre-foam treated samples [T] through [Y] were made using a PET extrusion blend that included a blowing agent and the untreated sample [S] was made using a PET extrusion blend that did not include a blowing agent. Pre-foam treated samples [T] through [Y] were treated with the same blowing agent, SAFOAM® CE-335, at various concentrations.

Figure 27:
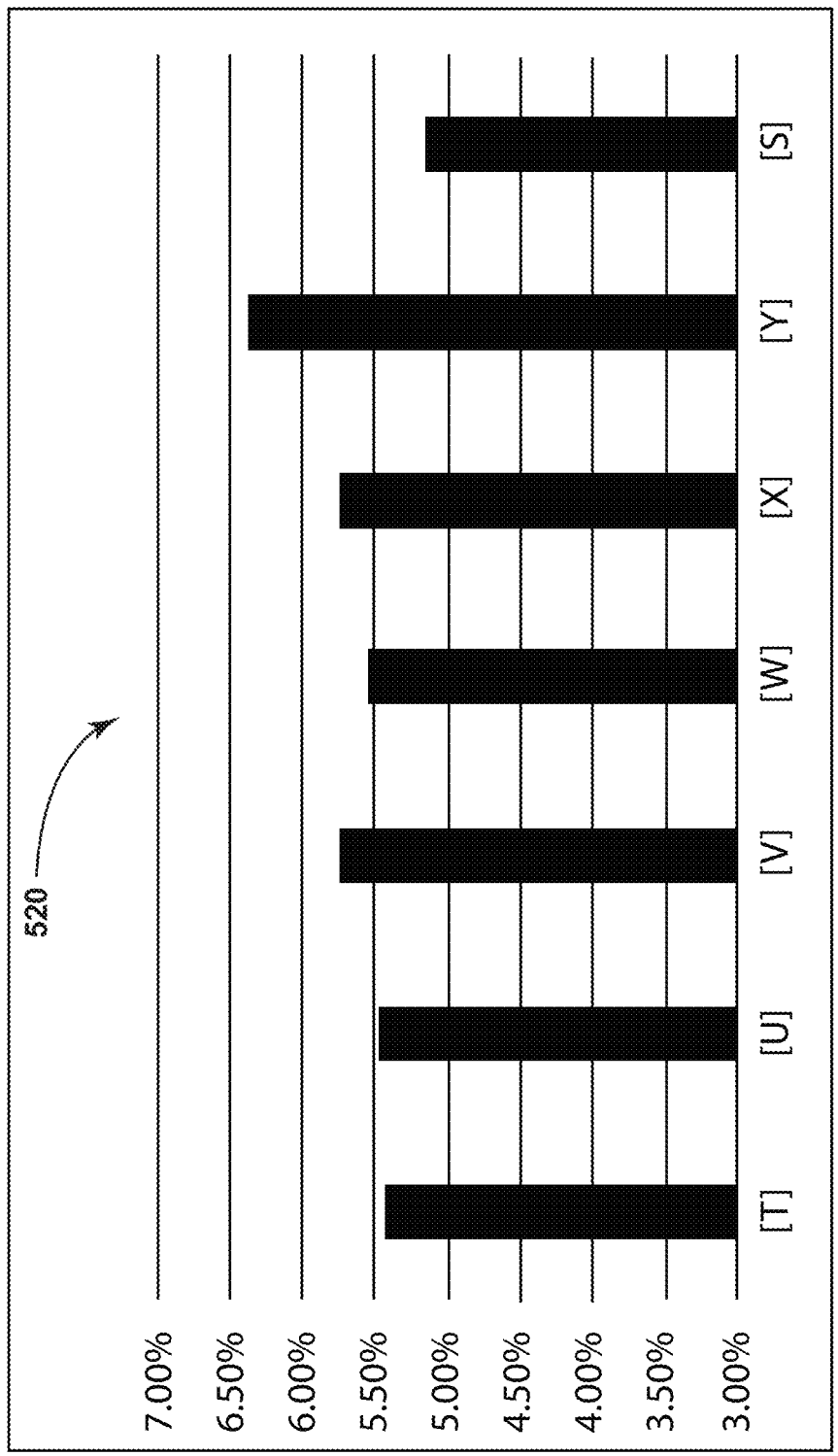
FIG. 27 illustrates a graph comparing an amount of carbon dioxide absorbed during an impregnation and foaming phase according to aspects of the present disclosure.

FIG. 27 illustrates a graph 20 demonstrating the effect of the pre-foam treatment process on the amount of gas absorbed during the gas impregnation phase of the solid state foaming process for pre-foam treated samples [T]-[Y] compared to the untreated sample [S] for the same pressure, temperature, and time conditions. The untreated sample [S] and pre-foam treated samples [T]-[Y] were all exposed to carbon dioxide in a pressure vessel at 660 psi for 36 hours, following by a 4 hour cap at 765 psi. The amount of absorbed carbon dioxide was measured following the 4 hour cap and is shown in FIG. 27. The samples were heated to 155 to 170° F. (about 68-77° C.) in a floating air oven to initiate foaming of the sheets as a result of the expansion of the impregnated carbon dioxide gas. The density of the untreated and treated samples is shown in Table 4.

The results of Table 4 and FIG. 27 illustrate that the pre-foam treatment phase 102 of the present disclosure effects aspects of the solid state foaming process and characteristics of the material produced. As shown in Table 4, the presence of a blowing agent in the pre-foam treatment phase 102 consistently results in a foam sheet having a lower density than the untreated foam sheet. FIG. 27 demonstrates the effect of the pre-foam treatment phase 102 on the amount of gas absorbed during the impregnation portion of the impregnation and foaming phase 104 compared to an untreated sample. Samples prepared according to the pre-foam treatment phase 102 consistently absorbed more gas than the untreated sample [S].

Example 16

Table 5 below compares the characteristics of a cup made according to a solid state foaming process that includes the pre-foam treatment phase 102 ("Pre-foam treatment cup") and a cup made without the pre-foam treatment phase 102 ("Untreated cup"). Both cups were made using PET and exposed to the same impregnation, foaming, and forming conditions, except that the Pre-foam treatment cup was made from a PET blend that included 0.4 wt. % of a blowing agent, SAFOAM® CE-335, according to the pre-foam treatment phase 102.

TABLE 5

Cup Characteristic Comparison

| Cup Test | Pre-foam treatment cup | Untreated cup |
|---|---|---|
| Weight (g) | 8.22 | 11.24 |
| Bottom Thickness (inches)/(mm) | 0.033/0.84 | 0.028/0.71 |
| | 0.035/0.89 | 0.027/0.68 |
| | 0.033/0.84 | 0.027/0.68 |
| Sidewall Thickness (inches)/(mm) | 0.056/1.4 | 0.041/1 |
| | 0.049/1.2 | 0.031/0.79 |
| | 0.043/1.1 | 0.026/0.66 |
| | 0.034/0.86 | 0.021/0.53 |
| ¼ Hot Deflection (kg) | 0.750 | 0.523 |
| | 0.753 | 0.562 |
| | 0.751 | 0.566 |
| Crush Force (lb)/(kg) | 67.65/30.7 | 48.54/22 |

The thickness of the cup bottom and sidewall was measured at 3 and 4 different locations, respectively, and the weight of each cup measured. The hot deflection test corresponds to the amount of force required to deflect a cup holding hot water (about 190° F./88° C.) 0.25 inches (6 mm). The force required to deflect the cup was measured at 3 different points 120 degrees apart around the circumference of the cup. The cup was filled with the hot water to the fill line and a force tester was used to measure the force required to deflect the cup the predetermined amount. The crush force was determined by connecting a metal crush plate to a digital force gauge and the force is measured as the crush plate is pressed downward onto a cup centered below the crush plate. The output of the force gauge is measured during movement of the crush plate and if a current reading differs from a previous reading by equal to or greater than 2%, the cup is determined to be crushed and the last force reading is recorded.

The results in Table 5 illustrate that the Pre-foam treatment cup has a lower weight and is stronger than the Untreated cup, as indicated by the deflection and crush force data. The lower weight of the Pre-foam treatment cup can provide cost savings in terms of storage and transport. The increased strength of the Pre-foam treatment cup is a characteristic often desired be consumers.

Foam Cell Structure

Figure 28A:
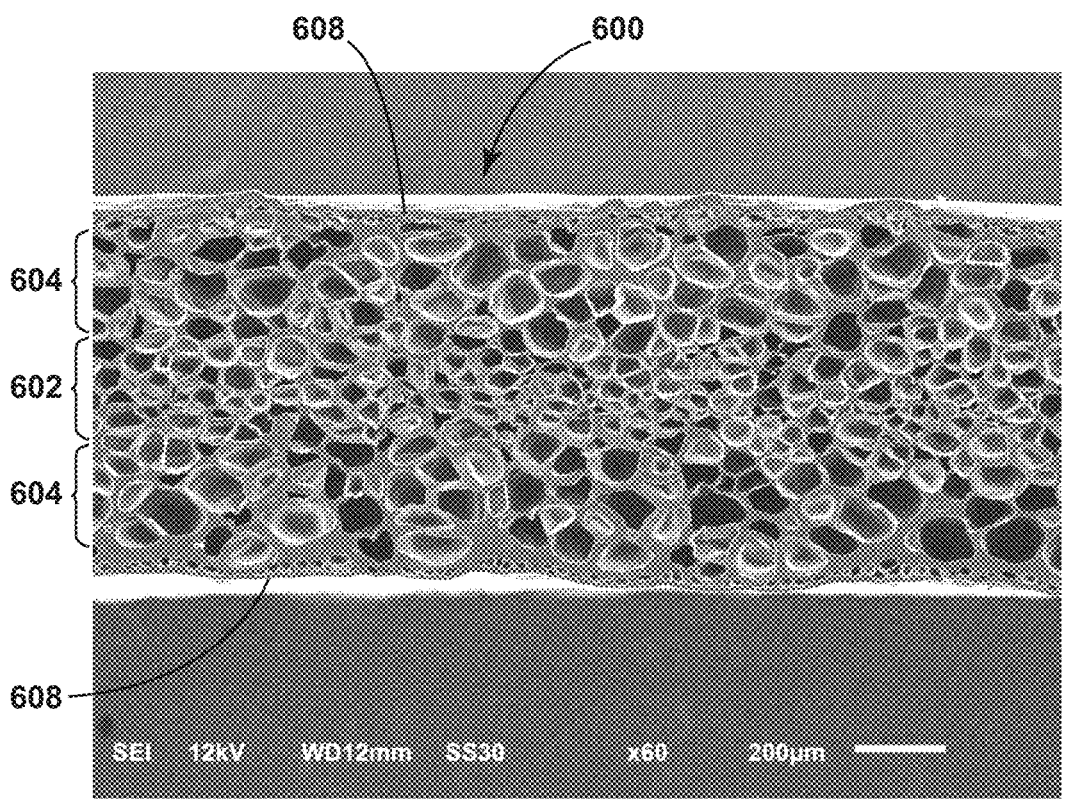
FIG. 28A illustrates a scanning electron microscopy (SEM) image at 60× magnification of a cross-section of a conventional microcellular foam article made according to a conventional process.
Figure 28B:
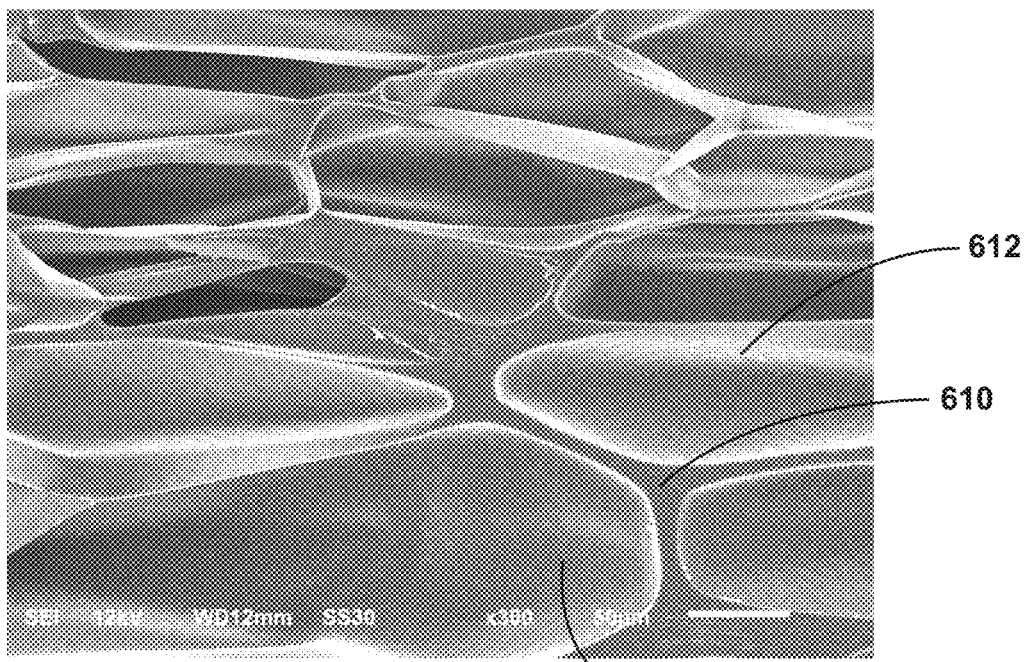
FIG. 28B illustrates a scanning electron microscopy (SEM) image at 300× magnification of a cross-section of a conventional microcellular foam article made according to a conventional process.
Figure 29A:
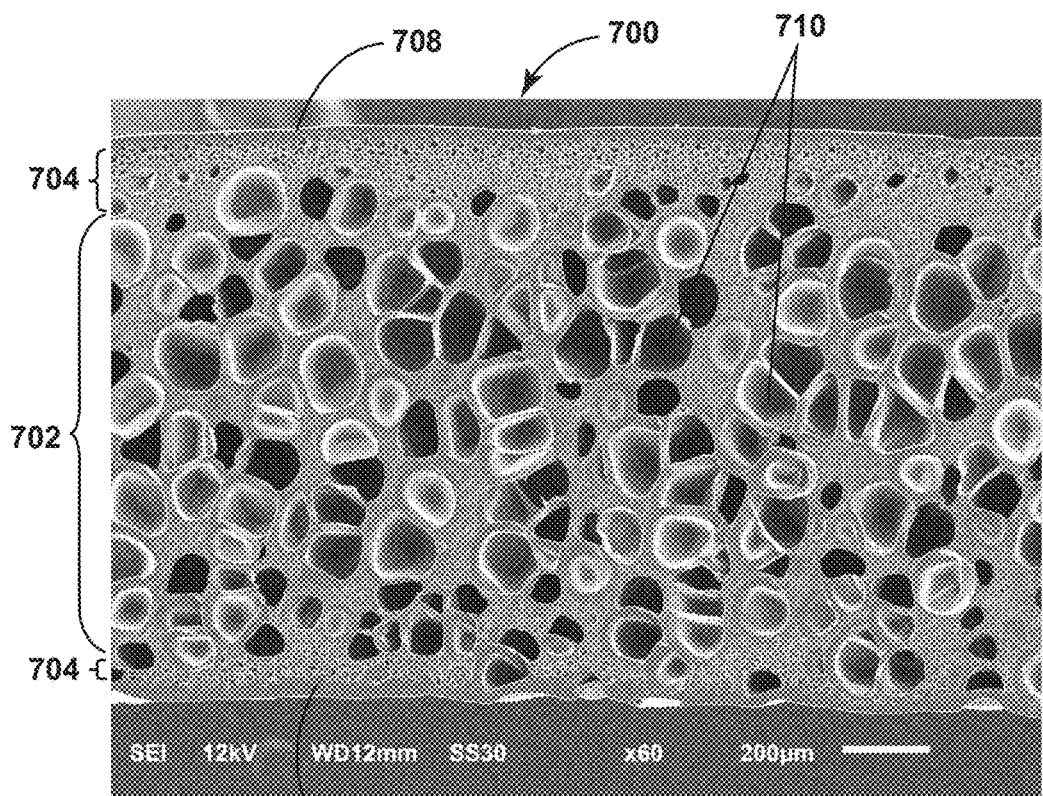
FIG. 29A illustrates a scanning electron microscopy (SEM) image at 60× magnification of a cross-section of a microcellular foam article made according to the solid state foaming process of the present disclosure including a pre-foam treatment phase.
Figure 29B:
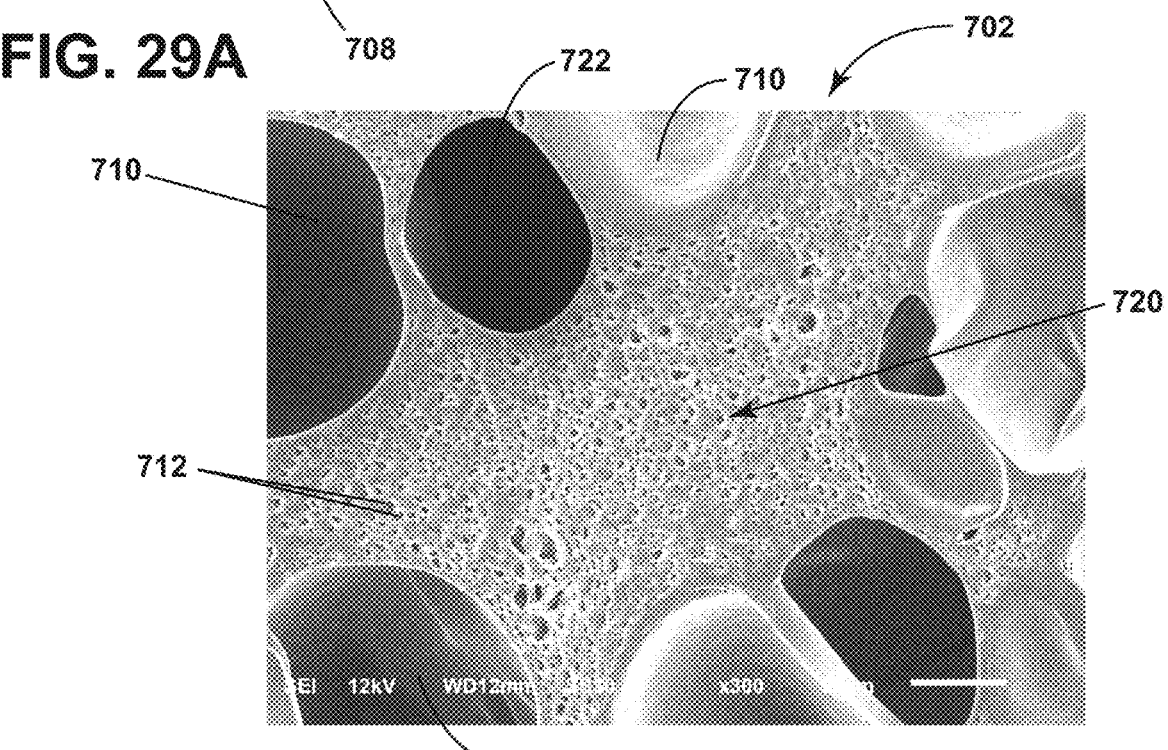
FIG. 29B illustrates a scanning electron microscopy (SEM) image at 300× magnification of a cross-section of a microcellular foam article made according to the solid state foaming process of the present disclosure including a pre-foam treatment phase.
Figure 28C:
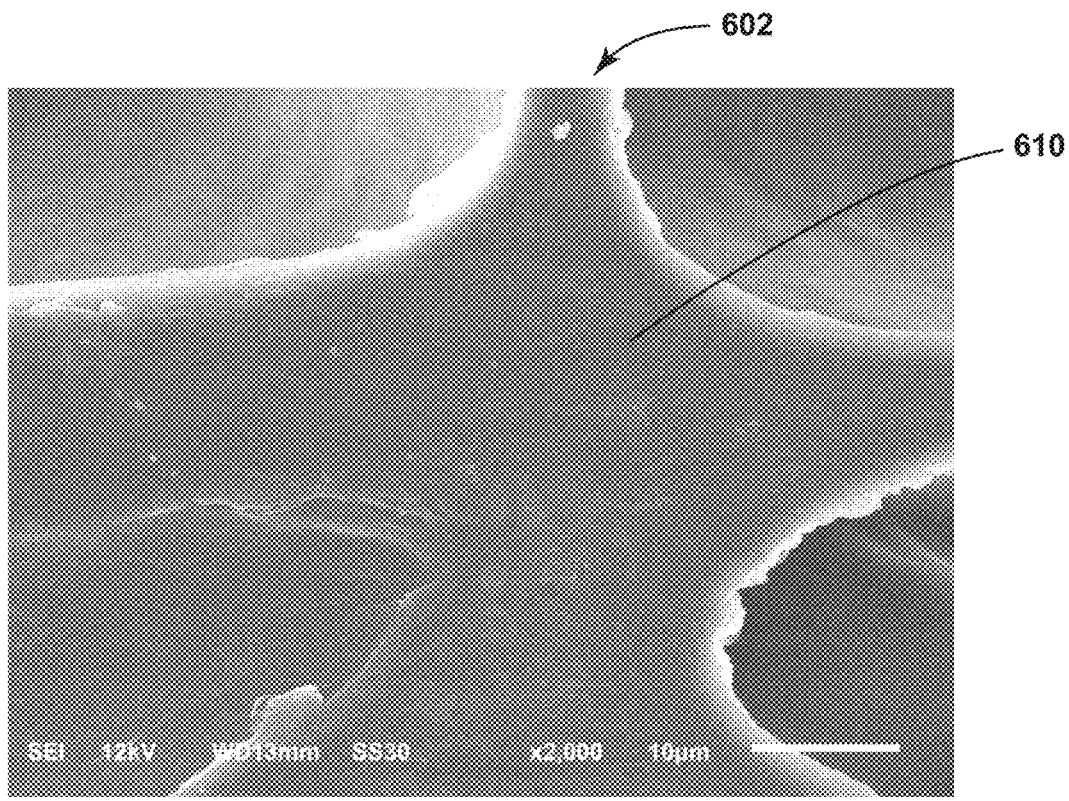
FIG. 28C illustrates a scanning electron microscopy (SEM) image at 2000× magnification of a cross-section of a conventional microcellular foam article made according to a conventional process.
Figure 29C:
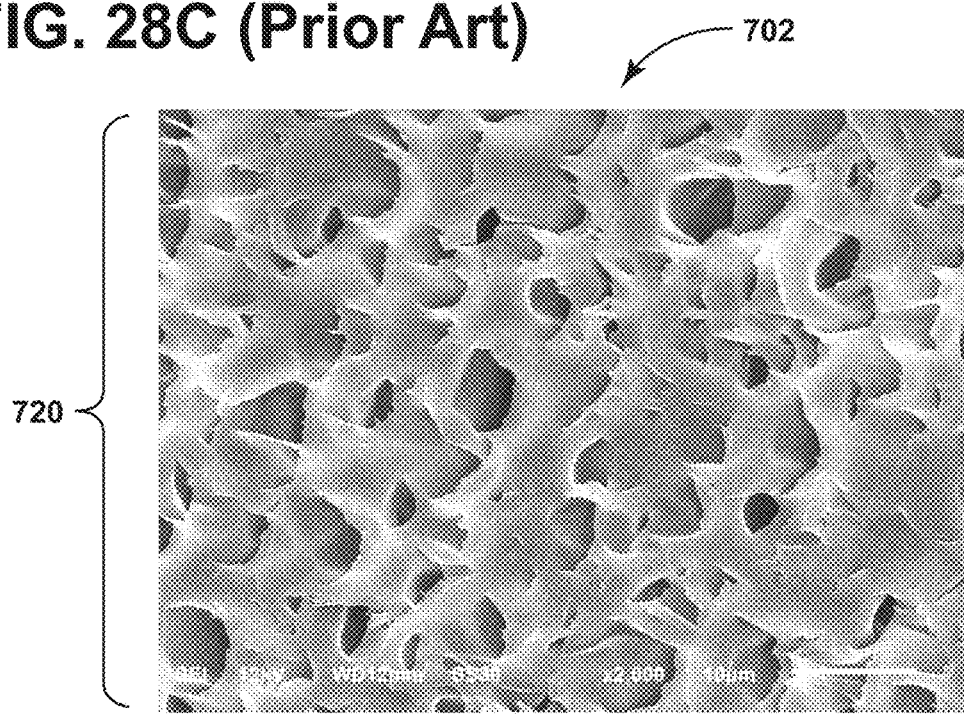
FIG. 29C illustrates a scanning electron microscopy (SEM) image at 2000× magnification of a cross-section of a microcellular foam article made according to the solid state foaming process of the present disclosure including a pre-foam treatment phase.

FIGS. 28A-C and 29A-C illustrate the cell structure of a foam material made according to the solid state foaming process 100 of FIG. 3 including the pre-foam treatment phase 102 compared to solid state foams made without the pre-foam treatment phase of the present disclosure. FIGS. 28A-C show scanning electron microscopy (SEM) images of a cross-section of a sidewall of a foam cup made according to a solid state foaming process that does not include the pre-foam treatment phase 102 of the present disclosure ("Untreated cup"). FIGS. 29A-C illustrate SEM images of cross-section of a cup sidewall of a foam cup made according to the solid state foaming process 100 of the present disclosure including the pre-foam treatment phase 102 ("Pre-foam treated cup").

The Untreated and Pre-foam treated cups were both made using PET and exposed to the same solid state foaming conditions in the impregnation and foaming phase 104 and the forming conditions in the forming phase 106, except that the Pre-foam treated cups included 0.4 wt. % of a blowing agent SAFOAM® CE-335 according to the pre-foam treatment phase 102. The foaming temperature was about 155-165° F. (68-74° C.).

FIG. 28A illustrates the cell structure in the cross-section of the Untreated cup 600, which generally includes discrete foamed sections 602 and 604 and unfoamed sections 608 forming layers within the foam material. This cell structure for a solid state foam material is consistent with the cell structure described in U.S. Pat. No. 10,029,401, entitled "Multi-Layer Foamed Polymeric Objects and Related Methods," issued on Jul. 24, 2018, incorporated herein by reference in its entirety. As illustrated in the higher resolution image in FIG. 28B, the material 610 between adjacent cells 612 and 614, i.e., the material defining the cells within each of the discrete foamed sections 602 and 604, is unfoamed. The exact number of discrete foamed sections and unfoamed sections can vary depending on materials and processing conditions, as described in U.S. Pat. No. 10,029,401. For example, Untreated cup 600 can optionally include a thin discrete foamed section between the discrete foamed section 604 and the adjacent unfoamed section 608 (sometimes referred to as a skin layer). The presence or thickness of the unfoamed section 608 (skin layer) can also vary depending on the materials and processing conditions, as is known in the art described herein.

FIG. 29A illustrates the cell structure according to the present disclosure in a cross-section of the Pre-foam treated cup 700, which generally includes a central foamed section 702, a pair of discrete foamed sections 704, and a pair of unfoamed sections 708 forming layers within the foam material. As illustrated in FIG. 29A, and more clearly visible in FIG. 29B, the central foamed section 702 includes a first population of cells 710 within which are interspersed a second population of cells 712 having a smaller cell size than the first population 710. While the exemplary Pre-foam treated cup 700 is illustrated as having a single discrete foam section 704 on each side of the central foamed section 702, the Pre-foam treated cup 700 can optionally include more or less discrete foam sections sandwiching the central foamed section 702. Optionally, the presence or thickness of the unfoamed section 708 (skin layer) can also vary depending on the materials and processing conditions.

With reference to FIG. 29B, at least a portion of material 720 between adjacent example cells 722 and 724 of the large cell size population 710 in the central foamed section 702 is itself foamed and includes the second, smaller population of cells 712. As discussed above, the Untreated cup (see FIG. 28B) includes cells that are defined by unfoamed material 610 between adjacent cells. In contrast, at least a portion of the material 720 defining the large cells 710 of the Pre-foam treated cup (see FIG. 29B), is itself foamed and includes the second smaller population of cells 712.

While each of the discrete foam layers 602, 604 of the Untreated cup 600 of FIGS. 28A-B includes a single population of cells, the Pre-foam treated cup 700 according to the present disclosure includes a first population of cells interspersed with a second population of cells having a much smaller cell size. FIGS. 28C and 29C illustrate the Untreated and Pre-foam treated cups, respectively, at the same resolution. At a 2000× zoom, it is clear from the images that the Untreated cup 600 does not include a second population of cells (i.e., foam material) in the material between adjacent cells within a discrete foam section. In contrast, FIG. 29C shows a foam material including a second, smaller cell size population of cells within the central foam section 702 between adjacent cells.

Table 6 below summarizes the cell size information for the exemplary Untreated cup 600 which was formed without the pre-foam treatment phase 102 of the present disclosure. The cell size was measured by measuring the length/diameter of each cell in the vertical and horizontal directions (with respect to the cross-section image) for multiple cells in the discrete foamed section 602 of the material in both the machine direction ("MD") and the cross direction ("CD") of the sheet used to form the cups at 2 different locations in the cup sidewall.

As used herein, the terms machine direction and cross direction are with respect to the stretching direction of the sheet during thermoforming. The machine direction ("MD") corresponds to the sheet stretching direction during thermoforming and thus corresponds to the vertical direction of the cup sidewall. The SEM cross section samples were cut into the cup sidewall vertically (MD) and horizontally (CD). Cell count refers to the number of cells measured for each population, "Min.-Max." refers to the minimum and maximum cell length, respectively, in the measured direction, and "Avg.±St. Dev." refers to the average cell length in the measured direction plus or minus the standard deviation.

TABLE 6

Untreated Cup Cell Structure

|  |  | Measurement* |
|---|---|---|
| MD, Horizontal | Cell Count | 38 (37) |
|  | Min.-Max. | 70-350 µm (80-360 µm) |
|  | Avg. ± St. Dev. | 200 ± 70 µm (200 ± 70 µm) |
| MD, Vertical | Cell Count | 46 (47) |
|  | Min.-Max. | 20-120 (20-100) |
|  | Avg. ± St. Dev. | 60 ± 20 µm (60 ± 20 µm) |
| CD, Horizontal | Cell Count | 85 (112) |
|  | Min.-Max. | 30-150 µm (20-180 µm) |
|  | Avg. ± St. Dev. | 80 ± 30 µm (80 ± 30 µm) |
| CD, Vertical | Cell Count | 108 (112) |
|  | Min.-Max. | 10-120 µm (20-110 µm) |
|  | Avg. ± St. Dev. | 50 ± 20 µm (50 ± 20 µm) |

*Measurements for two cross-section samples from the same cup are shown, with the measurement from the second cross-section shown in parenthese.

Table 7 below summarizes the cell size information for the first and second population of cells 710 and 712, respectively, of the exemplary Pre-foam treated cup 700 according to the present disclosure. The cell size was measured in the vertical and horizontal directions (with respect to the cross-section image) for multiple cells in the central foamed section 702 of the material in both the machine direction ("MD") and the cross direction ("CD") of the sheet used to form the cups.

TABLE 7

Pre-foam Treated Cup Cell Structure

| | | First Population | Second Population |
|---|---|---|---|
| MD, Horizontal | Cell Count | 24 | 27 |
| | Min.-Max. | 220-570 μm | 3-20 μm |
| | Avg. ± St. Dev. | 400 ± 90 μm | 8 ± 3 μm |
| MD, Vertical | Cell Count | 32 | 32 |
| | Min.-Max. | 40-280 μm | 1-9 μm |
| | Avg. ± St. Dev. | 160 ± 50 μm | 4 ± 2 μm |
| CD, Horizontal | Cell Count | 61 | 18 |
| | Min.-Max. | 40-300 μm | 2-20 μm |
| | Avg. ± St. Dev. | 160 ± 50 μm | 8 ± 4 μm |
| CD, Vertical | Cell Count | 45 | 20 |
| | Min.-Max. | 70-300 μm | 2-14 μm |
| | Avg. ± St. Dev. | 180 ± 40 μm | 5 ± 3 μm |

As illustrated by the data in Table 7, the second population of small cells have a cell size in the microcellular size range and are generally an order of magnitude smaller than the larger cells of the first population of cells. A common definition of a microcellular plastic foam includes foams having an average cell size on the order of 10 micrometers in diameter, typically ranging from about 0.1 to about 100 micrometers. Thus, the second population of small cells can be considered as forming a microcellular foam as the range and average cell size is less than about 20 micrometers. The first population of larger cells has a range and average cell size that is significantly greater than the second population of microcells that is closer to the cell size for a conventional foam material. According to one aspect of the present disclosure, the material of the present disclosure includes a foam-within-a-foam structure in which a microcellular foam is formed within the material forming a larger foam structure. The second population of cells are formed in the material defining the first population of cells within the central foamed section.

The solid state foaming process according to the present disclosure with the pre-foam treatment phase provides a microfoam material having properties and structural characteristics that are distinct from conventional solid state foamed materials. The solid state foamed materials of the present disclosure and the containers made from such materials exhibit improved properties, such as increased thermal insulation and strength compared to conventional solid state foamed materials that are not made according to the present disclosure. The solid state foamed materials and containers therefrom of the present disclosure have a distinct structural characteristic including a first population of cells within which are interspersed a second population of cells having a smaller cell size than the first population within a single discrete foamed section of the material. Without being limited by any theory, according to an aspect of the present disclosure, the combination of the larger cell size of the first population and the smaller cell size of the second population work in concert to provide improved thermal insulation and improved strength to the solid state foam material.

There are several distinctions between the cell structure of the Pre-foam treated cup 700 of the present disclosure and the cell structure of the Untreated cup 600. As discussed above with respect to the images of FIGS. 28A-C and Table 6, the Untreated cup made according to a conventional solid state foaming process includes a central discrete foam section that includes a single population of cells compared to the Pre-foam treated cup 700, which includes a first population of cells within which are interspersed a second population of cells having a smaller cell size than the first population.

In addition, the microfoam of the Pre-foam treated cup 700 includes a population of cells having a cell size that is significantly smaller than the cells in the Untreated cup 600. The second population of microfoam cells in the Pre-foam treated cup 700 have a cell dimension, vertical and horizontal, in both the CD and MD directions that is less than 20 micrometers, with the majority of the cells have a cell dimension less than 10 micrometers. In contrast, the Untreated cup has cell dimensions in the several 10s to 100s of micrometers. Thus, the size and distribution of the cells of the Pre-foam treated cup 700 are distinct from those of the Untreated cup.

The following clauses define additional aspects of the present disclosure which are encompassed herein. These aspects can be combined as desired to form combinations that are encompassed by the present disclosure.

According to an aspect of the present disclosure, a solid state foaming process for generating a microcellular foam sheet for use in forming a container includes extruding a first layer including a first polymeric material and a blowing agent, wherein the first layer has a first density, a first expansion comprising at least partially expanding the first layer with the blowing agent to form a pre-foamed sheet comprising a pre-foamed layer having a second density, less than the first density, impregnating the pre-foamed layer in a solid state with a non-reacting gas that is soluble in the first polymeric material, and a second expansion comprising at least partially expanding the pre-foamed layer with the non-reacting gas to form a microcellular foam layer having a third density, less than the second density, which can optionally be combined with any one or any combination of the following features: the process including co-extruding, laminating, or extrusion coating a second layer adjacent the first layer to form a multi-layer sheet; the second layer can be made from a polymeric material selected from the group including polyethylene terephthalate (PET), polyether ether ketone (PEEK), polyethylene naphthalate (PEN), polybutylene terephthalate (PBT), polymethyl methacrylate (PMMA), polylactide (PLA), polyhydroxy acid (PHA), polypropylene (PP), polyethylene (PE), or thermoplastic urethane (TPU); the second layer can include a blowing agent; the blowing agent in the second layer can be present in an amount in the range of about 0.1 to 5 wt. %; the process can further include heating the microcellular foam sheet and applying the heated microcellular foam sheet about an article mold to form at least one article in the heated microcellular foam sheet; a third expansion initiated by the heating of the microcellular foam sheet; the process wherein the third expansion decreases a density of the microcellular foam sheet by about 65 to 92%, optionally about 65 to 85%, further optionally about 75 to 92%; the first layer can include a nucleating agent; the nucleating agent can be different than the blowing agent; the microcellular foam layer can include a central foam section having a first population of cells within which are interspersed a second population of cells having a smaller cell size than the first population; the first population can have a cell diameter in at least one direction of about 160±50 micrometers or 180±40 micrometers; and/or the second population can have a cell diameter in at least one direction of about 8±4 micrometers or 5±3 micrometers.

According to an aspect of the present disclosure, a foamed microcellular foam sheet for use in forming a container can include a central foamed section defining a foam layer within the microcellular foam sheet and having a first population of cells within which are interspersed a second population of cells having a smaller cell size than the first population, wherein the second population of cells are formed in the material defining the first population of cells within the central foamed section and one or more discrete foamed sections, one or more discrete unfoamed sections defining a skin layer, or a combination of one or more discrete foamed and unfoamed sections on one or both sides of the central foamed section, which can optionally be combined with any one or any combination of the following features: a co-extruded, laminated, or extrusion coated second layer provided adjacent the first layer to form a multi-layer sheet; the second layer can be made from a polymeric material selected from the group including polyethylene terephthalate (PET), polyether ether ketone (PEEK), polyethylene naphthalate (PEN), polybutylene terephthalate (PBT), polymethyl methacrylate (PMMA), polylactide (PLA), polyhydroxy acid (PHA), polypropylene (PP), polyethylene (PE), or thermoplastic urethane (TPU); the second layer can include a blowing agent; the blowing agent in the second layer can be present in an amount in the range of about 0.1 to 5 wt. %; the first layer can include a nucleating agent; the nucleating agent can be different than the blowing agent; the first population can have a cell diameter in at least one direction of about 160±50 micrometers or 180±40 micrometers; and/or the second population can have a cell diameter in at least one direction of about 8±4 micrometers or 5±3 micrometers.

To the extent not already described, the different features and structures of the various embodiments of the present disclosure may be used in combination with each other as desired. For example, one or more of the features illustrated and/or described with respect to one aspect of the disclosure can be used with or combined with one or more features illustrated and/or described with respect to other aspects of the disclosure. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A solid state foaming process for generating a microcellular foam sheet for use in forming a container, the process comprising:
   extruding a first layer including a first polymeric material and a blowing agent, wherein the first layer has a first density;
   a first expansion comprising at least partially expanding the first layer with the blowing agent to form a pre-foamed sheet comprising a pre-foamed layer having a second density, less than the first density;
   impregnating the pre-foamed layer in a solid state with a non-reacting gas that is soluble in the first polymeric material, proceeding until a predetermined concentration of the non-reacting gas in the first polymeric material is in the range of about 3.5 to 6 wt. %; and
   a second expansion comprising at least partially expanding the pre-foamed layer with the non-reacting gas to form a microcellular foam layer having a third density, less than the second density.

2. The process of claim 1 wherein the first polymeric material comprises polyethylene terephthalate (PET), polyether ether ketone (PEEK), polyethylene naphthalate (PEN), polybutylene terephthalate (PBT), polymethyl methacrylate (PMMA), polylactide (PLA), polyhydroxy acid (PHA), polypropylene (PP), polyethylene (PE), or thermoplastic urethane (TPU).

3. The process according to claim 1 wherein the blowing agent comprises one of a chemical blowing agent or a physical blowing agent.

4. The process according to claim 3 wherein the chemical blowing agent comprises a combination of sodium bicarbonate and citric acid, a combination of sodium citrate and calcium carbonate, or a combination of calcium distearate, limestone, and calcium oxide.

5. The process according to claim 1 wherein the first expansion occurs during or subsequent to the first polymeric material passing through a die outlet during extrusion.

6. The process according to claim 1 wherein impregnating the pre-foamed layer comprises at least one of:
   exposing the pre-foamed layer to the non-reacting gas at a pressure greater than atmospheric pressure for a predetermined period of time within the range of about 2-60 hours; or
   exposing the pre-foamed layer to the non-reacting gas at a pressure of about 600 to 900 psi for a predetermined period of time within the range of about 2-60 hours.

7. The process according to claim 1 wherein at least one of:
   the second density is less than the first density by about 12% or less; or
   the third density is less than the second density by about 35 to 65%.

8. The process according to claim 1 comprising a desorption phase subsequent to the impregnating the pre-foamed layer with the non-reacting gas and prior to the second expansion, wherein the desorption phase occurs one of at atmospheric pressure or less, at a temperature at or below about −6° C., or a combination thereof.

9. The process according to claim 1 further comprising co-extruding, laminating, or extrusion coating a second layer adjacent the first layer to form a multi-layer sheet.

10. The process according to claim 1 wherein the second expansion comprises heating the pre-foamed sheet.

11. The process according to claim 1 wherein a predetermined period of time to reach the predetermined concentration of the non-reacting gas is in the range of about 50% or less of a period of time to achieve the same predetermined concentration of non-reacting gas in a layer that is not pre-foamed.

12. The process according to claim 1 wherein an amount of the blowing agent is in the range of about 0.1 to 5 wt. %.

13. The process according to claim 1 wherein the first polymeric material comprises at least one nucleating agent selected from one of an inorganic nucleating agent, an organic nucleating agent, or combinations thereof.

14. The process according to claim 13 wherein the nucleating agent is selected from the group consisting of talc and polytetrafluoroethylene.

15. The process according to claim 14 wherein the at least one nucleating agent is present in an amount of about 0.5 to 5 wt. %.

16. The process according to claim 1 wherein the microcellular foam layer comprises a central foam section having a first population of cells within which are interspersed a second population of cells having a smaller cell size than the first population of cells.

17. The process according to claim 16 wherein the first population of cells comprises an average diameter of greater than 100 micrometers and the second population of cells comprises an average diameter of less than 10 micrometers.

18. A solid state foaming process for generating a microcellular foam sheet for use in forming a container, the process comprising:
- extruding a first layer including a first polymeric material and a blowing agent, wherein the first layer has a first density;
- a first expansion comprising at least partially expanding the first layer with the blowing agent to form a pre-foamed sheet comprising a pre-foamed layer having a second density, less than the first density;
- impregnating the pre-foamed layer in a solid state with a non-reacting gas that is soluble in the first polymeric material; and
- a second expansion comprising at least partially expanding the pre-foamed layer with the non-reacting gas to form a microcellular foam layer having a third density, less than the second density, wherein the microcellular foam layer comprises a central foam section having a first population of cells within which are interspersed a second population of cells having a smaller cell size than the first population of cells.

19. The process according to claim 18 wherein the first population of cells comprises an average diameter of greater than 100 micrometers and the second population of cells comprises an average diameter of less than 10 micrometers.

20. A solid state foaming process for generating a microcellular foam sheet for use in forming a container, the process comprising:
- extruding a first layer including a first polymeric material and a blowing agent, wherein the first layer has a first density;
- a first expansion comprising at least partially expanding the first layer with the blowing agent to form a pre-foamed sheet comprising a pre-foamed layer having a second density, less than the first density;
- impregnating the pre-foamed layer in a solid state with a non-reacting gas that is soluble in the first polymeric material; and
- a second expansion comprising at least partially expanding the pre-foamed layer with the non-reacting gas to form a microcellular foam layer having a third density, less than the second density, wherein the second density is less than the first density by about 12% or less and the third density is less than the second density by about 35 to 65%.

* * * * *